United States Patent
Zhi et al.

(10) Patent No.: US 11,569,529 B2
(45) Date of Patent: Jan. 31, 2023

(54) HYDROGEL ELECTROLYTE HAVING MULTIPLE CROSSLINKED STRUCTURES AND AN ENERGY STORAGE DEVICE INCLUDING SUCH ELECTROLYTE

(71) Applicant: City University of Hong Kong, Kowloon (HK)

(72) Inventors: Chunyi Zhi, Kowloon (HK); Longtao Ma, Kowloon Tong (HK); Zijie Tang, Kowloon Tong (HK); Hongfei Li, Kowloon Tong (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 16/216,168

(22) Filed: Dec. 11, 2018

(65) Prior Publication Data
US 2020/0185770 A1 Jun. 11, 2020

(51) Int. Cl.
| | |
|---|---|
| *H01M 10/0565* | (2010.01) |
| *H01M 10/0567* | (2010.01) |
| *H01M 10/0568* | (2010.01) |
| *H01M 10/0569* | (2010.01) |
| *C08K 3/01* | (2018.01) |
| *C08K 5/00* | (2006.01) |

(Continued)

(52) U.S. Cl.
CPC ........... *H01M 10/0565* (2013.01); *C08K 3/01* (2018.01); *C08K 5/0025* (2013.01); *H01M 4/0402* (2013.01); *H01M 4/0464* (2013.01); *H01M 10/0567* (2013.01); *H01M 10/0568* (2013.01); *H01M 10/0569* (2013.01); *H01M 50/10* (2021.01)

(58) Field of Classification Search
CPC ......... H01M 10/0565; H01M 10/0567; H01M 4/0464; H01M 4/0402; H01M 2/0207; H01M 10/0568; H01M 10/0569; H01M 50/10; H01M 4/9083; H01M 2300/0025; H01M 12/08; C08K 5/0025; C08K 3/01; Y02E 60/10
See application file for complete search history.

(56) References Cited

U.S. PATENT DOCUMENTS

| | | | | |
|---|---|---|---|---|
| 2003/0232895 A1* | 12/2003 | Omidian | ............... | C08F 220/06 |
| | | | | 521/99 |
| 2014/0099571 A1* | 4/2014 | Proietti | ............... | H01M 4/9083 |
| | | | | 429/527 |
| 2014/0205909 A1* | 7/2014 | Yonehara | ............... | H01M 10/24 |
| | | | | 429/302 |

FOREIGN PATENT DOCUMENTS

CN 129642 C * 1/2007 ................ C08J 5/12

OTHER PUBLICATIONS

Machine translation of CN 1296426C, Cao Yuliang, 2007 (Year: 2007).*

(Continued)

*Primary Examiner* — Kwang Han
(74) *Attorney, Agent, or Firm* — Renner Kenner Greive Bobak Taylor & Weber

(57) ABSTRACT

An electrolyte for use in an energy storage device, an energy storage device and a method of forming such electrolyte. The electrolyte includes a polymer matrix of at least two crosslinked structures, including a first polymeric material and a second polymeric material; and an electrolytic solution retained by the polymer matrix; wherein the electrolyte is arranged to physically deform when subjected to an external mechanical load applied to the polymer matrix.

21 Claims, 21 Drawing Sheets

(51) Int. Cl.
H01M 4/04 (2006.01)
H01M 50/10 (2021.01)

(56) References Cited

OTHER PUBLICATIONS

Qu, S, et al, Electrochemical approach to prepare integrated air electrodes for highly stretchable zinc-air battery array with tunable output voltage and current for wearable electronics. Nano Energy 2017,39, 101-110.
Yifan, X, et al, Stretchable, and Rechargeable Fiber-Shaped Zinc-Air Battery Based on Cross-Stacked Carbon Nanotube Sheets. Angewandte Chemie International Edition 2015, 54, 15390-15394.
Abhinav M. Gaikwad, et al, Highly Stretchable Alkaline Batteries Based on an Embedded Conductive Fabric. Advanced Materials 2012, 24, 5071-5076.
B. Li, J. Quan, A. Loh, J. Chai, Y. Chen, C. Tan, X. Ge, T. S. A. Hor, Z. Liu, H. Zhang, Y. Zong, A Robust Hybrid Zn-Battery with Ultralong Cycle Life, Nano Letters 2017, 17, 156.
J. Lee, T. Sun, R. Cao, N. Choi, L. M. Liu. K. Lee, J. Cho, Metal-Air Batteries with High Energy Density: Li-Air versus Zn-Air, Advanced Energy Materials 2011, 1, 34.
L. Ma, S. Chen, Z. Pei, Y. Huang, G. Liang, F. Mo, Q. Yang, J. Su, Y. Gao, J. A. Zapien, C. Zhi, Single-Site Active Iron-Based Bifunctional Oxygen Catalyst for a Compressible and Rechargeable Zinc-Air Battery, ACS Nano 2018, 12, 1949.
Z. Pei, H. Li, Y. Huang, Q. Xue, Y. Huang, M. Zhu, Z. Wang, C. Zhi, Texturing in situ: N,S-enriched hierarchically porous carbon as a highly active reversible oxygen electrocatalyst, Energy & Environmental Science 2017, 10, 742.
Z. Pei, Z. Tang, Z. Liu, Y. Huang, Y. Wang, H. Li, Q. Xue, M. Zhu, D. Tang, C. Zhi, Construction of a hierarchical 3D Co/N-carbon electrocatalyst for efficient oxygen reduction and overall water splitting, Journal of Materials Chemistry A 2018, 6, 489.
S. Chen, J. Cheng, L. Ma, S. Zhou, X. Xu, C. Zhi, W. Zhang, L. Zhi, J. A. Zapien, Light-weight 3D Co-N-doped hollow carbon spheres as efficient electrocatalysts for rechargeable zinc-air batteries, Nanoscale 2018, 10, 10412.
J. Park, M. Park, G. Nam, J. S. Lee, J. Cho, All-Solid-State Cable-Type Flexible Zinc-Air Battery, Advanced Materials 2015, 27, 1396.
S. Li, C. Cheng, H. W. Liang, X. Feng, A. Thomas, 2D Porous Carbons prepared from Layered Organic-Inorganic Hybrids and their Use as Oxygen-Reduction Electrocatalysts, Adv. Mater. 2017, 29, 1700707.
Lin. Li, Z. Chang, X. Zhang, Recent Progress on the Development of Metal-Air Batteries, Advanced Sustainable Systems 2017, 1, 1700036.
H. Li, C. Han, Y. Huang, Y. Huang, M. Zhu, Z. Pei, Q. Xue, Z. Wang, Z. Liu, Z. Tang, Y. Wang, F. Kang, B. Li, C. Zhi, An extremely safe and wearable solid-state zinc ion battery based on a hierarchical structured polymer electrolyte, Energy & Environmental Science 2018, 11, 941.
F. Meng, H. Zhong, D. Bao, J. Yan, X. Zhang, In Situ Coupling of Strung Co4N and Intertwined N—C Fibers toward Free-Standing Bifunctional Cathode for Robust, Efficient, and Flexible Zn-Air Batteries, Journal of the American Chemical Society 2016, 138, 10226.
Z. Wang, D. Xu, J. Xu, X. Zhang, Oxygen electrocatalysts in metal-air batteries: from aqueous to nonaqueous electrolytes, Chemical Society Reviews 2014, 43, 7746.
Q. Liu, Y. Wang, L. Dai, J. Yao, Scalable Fabrication of Nanoporous Carbon Fiber Films as Bifunctional Catalytic Electrodes for Flexible Zn-Air Batteries, Advanced Materials 2016, 28, 3000.
J. Fu, D. Lee, F. Hanssan, L. Yang, Z. Bai, M. Park, Z. Chen, , Advanced Materials 2015, 27, 5617.
J. Fu, Z. Cano, A. Yu, M. Fowler, Z. Chen, Electrically Rechargeable Zinc-Air Batteries: Progress, Challenges, and Perspectives, Advanced Materials 2017, 29, 1604685.
H. Lee, J. Lim, H. Kim, S. Jeong, S. Eom, T. Hong, S. Lee, Electrospun polyetherimide nanofiber mat-reinforced, permselective polyvinyl alcohol composite separator membranes: A membrane-driven step closer toward rechargeable zinc-air batteries, Journal of Membrane Science 2016, 499, 526.
C. Tang, B. Wang, H. Wang, Q. Zhang, Defect Engineering toward Atomic Co—Nx—C in Hierarchical Graphene for Rechargeable Flexible Solid Zn-Air Batteries, Advanced Materials 2017, 29, 1703185.
X. Cheng, J. Pan, Y. Zhao, M. Liao, H. Peng, Gel Polymer Electrolytes for Electrochemical Energy Storage, Advanced Energy Materials 2017, 8, 1702184.
L. Ma, S. Chen, H. Li, Z. Ruan, Z. Tang, Z. Liu, Z. Wang, Y. Huang, Z. Pei, J. A. Zapien, C. Zhi, Initiating a mild aqueous electrolyte Co3O4/Zn battery with 2.2 V-high voltage and 5000-cycle lifespan by a Co(III) rich-electrode, Energy & Environmental Science 2018, DOI: 10.1039/c8ee01415a.
M. Zhu, Z. Wang, H. Li, Y. Xiong, Z. Liu, Z. Tang, Y. Huang, A. L. Rogach, C. Zhi, Light-permeable, photoluminescent microbatteries embedded in the color filter of a screen, Energy & Environmental Science 2018, DOI: 10.1039/c8ee00590g.
H. Li, Z. Liu, G. Liang, Y. Huang, Y. Huang, M. Zhu, Z. Pei, Q. Xue, Z. Tang, Y. Wang, B. Li, C. Zhi, Waterproof and Tailorable Elastic Rechargeable Yarn Zinc Ion Batteries by a Cross-Linked Polyacrylamide Electrolyte, ACS Nano 2018, 12, 3140.
Y. Huang, M. Zhong, F. Shi, X. Liu, Z. Tang, Y. Wang, Y. Huang, H. Hou, X. Xie, C. Zhi, An Intrinsically Stretchable and Compressible Supercapacitor Containing a Polyacrylamide Hydrogel Electrolyte, Angewandte Chemie International Edition 2017, 56, 9141.
Y. Huang, M. Zhong, Y. Huang, M. Zhu, Z. Pei, Z. Wang, Q. Xue, X. Xie, C. Zhi, A self-healable and highly stretchable supercapacitor based on a dual crosslinked polyelectrolyte, Nature Communications 2015, 6, 10310.
M. Pandey, N. Mohamad, M. C. I. M. Amin, Bacterial Cellulose/Acrylamide pH-Sensitive Smart Hydrogel: Development, Characterization, and Toxicity Studies in ICR Mice Model, Molecular Pharmaceutics 2014, 11, 3596.
D. Hatanaka, K. Yamamoto, J. Kadokawa, Preparation of chitin nanofiber-reinforced carboxymethyl cellulose films, International Journal of Biological Macromolecules 2014, 69, 35.
C. Shao, M. Wang, L. Meng, H. Chang, B. Wang, F. Xu, J. Yang, P. Wan, Mussel-Inspired Cellulose Nanocomposite Tough Hydrogels with Synergistic Self-Healing, Adhesive, and Strain-Sensitive Properties, Chemistry of Materials 2018, 30, 3110.
A. M. Bochek, L. D. Yusupova, N. M. Zabivalova, G. A. Petropavlovskii, Rheological Properties of Aqueous H-Carboxymethyl Cellulose Solutions with Various Additives, Russian Journal of Applied Chemistry 2002, 75, 645.
N. Xue, L. Wang, M. Pei, Y. He, Y. Du, W. Guo, Preparation and characterization of sodium polyacrylate-grafted bentonite and its performance removing Pb2+ from aqueous solutions, RSC Advances 2016, 6, 98945.
D. Zhao, J. Huang, Y. Zhong, K. Li, L. Zhang, J. Cai, High-Strength and High-Toughness Double-Cross-Linked Cellulose Hydrogels: A New Strategy Using Sequential Chemical and Physical Cross-Linking, Advanced Functional Materials 2016, 26, 6279.
Y. Maréchal, H. Chanzy, The hydrogen bond network in Ib cellulose as observed by infrared spectrometry, Journal of Molecular Structure 2000, 523, 183.
Y. Zhang, C. Li, X. Cai, J. Yao, M. Li, X. Zhang, Q. Liu, High alkaline tolerant electrolyte membrane with improved conductivity and mechanical strength via lithium chloride/ dimethylacetamide dissolved microcrystalline cellulose for Zn-Air batteries, Electrochimica Acta 2016, 220, 635.
T. Zhou, R. Shao, S. Chen, X. He, J. Qiao, J. Zhang, A review of radiation-grafted polymer electrolyte membranes for alkaline polymer electrolyte membrane fuel cells, Journal of Power Sources 2015, 293, 946.
Z. Pei, J. Gu, Y. Wang, Z. Tang, Z. Liu, Y. Huang, Y. Huang, J. Zhao, Z. Chen, C. Zhi, Component Matters: Paving the Roadmap toward Enhanced Electrocatalytic Performance of Graphitic C3N4-Based Catalysts via Atomic Tuning, ACS Nano 2017, 11, 6004.

(56) References Cited

OTHER PUBLICATIONS

S. Liu, M. Wang, X. Sun, N. Xu, J. Liu, Y. Wang, T. Qian, C. Yan, Facilitated Oxygen Chemisorption in Heteroatom-Doped Carbon for Improved Oxygen Reaction Activity in All-Solid-State Zinc-Air Batteries, Advanced Materials 2018, 30, 1704898.
Q. Li, X. Wang, K. Tang, M. Wang, C. Wang, C. Yan, Electronic Modulation of Electrocatalytically Active Center of Cu7S4 Nanodisks by Cobalt-Doping for Highly Efficient Oxygen Evolution Reaction, ACS Nano 2017, 11, 12230.
Z. Wang, J. Cheng, Q. Guan, H. Huang, Y. Li, J. Zhou, W. Ni, B. Wang, S. He, H. Peng, All-in-one fiber for stretchable fiber-shaped tandem supercapacitors, Nano Energy 2018, 45, 210.
Y. Zhang, Y. Jiao, L. Lu, L. Wang, T. Chen, H. Peng, An Ultraflexible Silicon-Oxygen Battery Fiber with High Energy Density, Angewandte Chemie International Edition 2017, 56, 13741.
H. Sun, Y. Zhang, J. Zhang, X. Sun, H. Peng, Energy harvesting and storage in 1D devices, Nature Reviews Materials 2017, 2, 17023.

\* cited by examiner

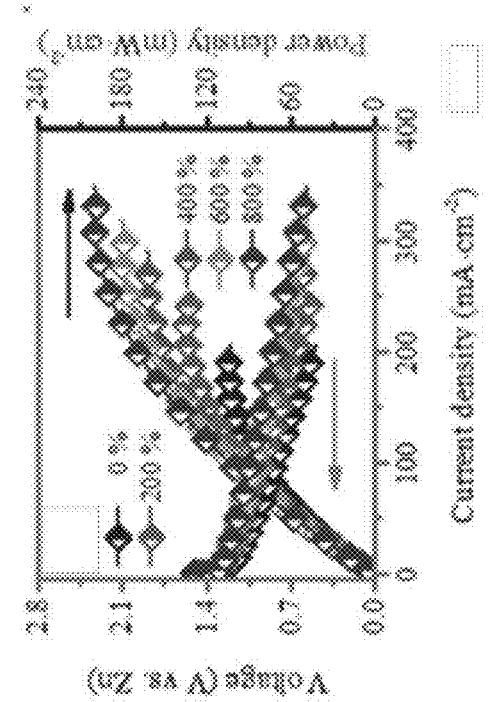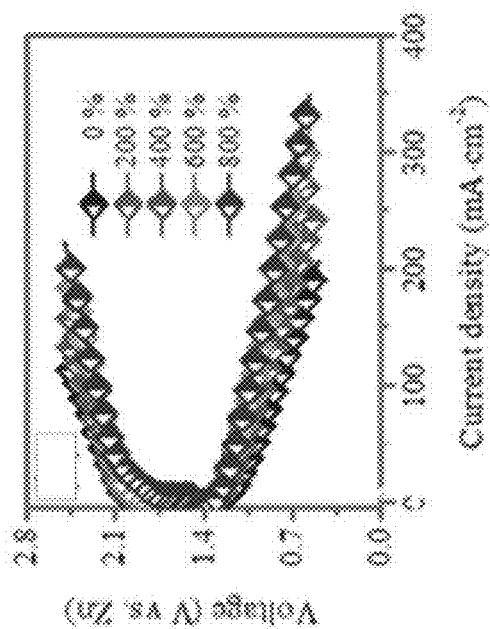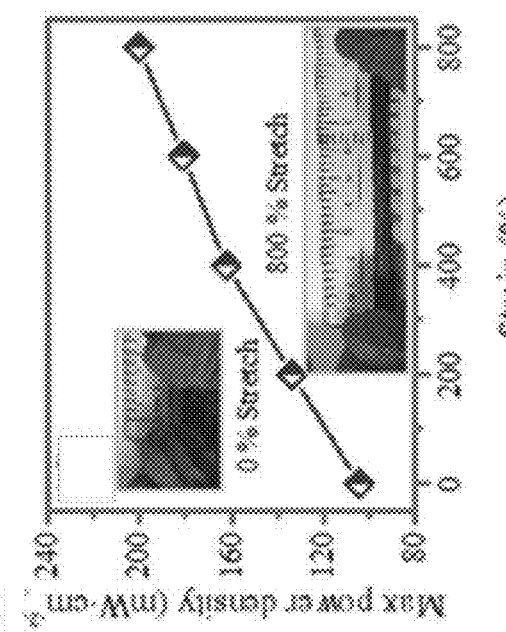
Fig. 11A
Fig. 11B
Fig. 11C

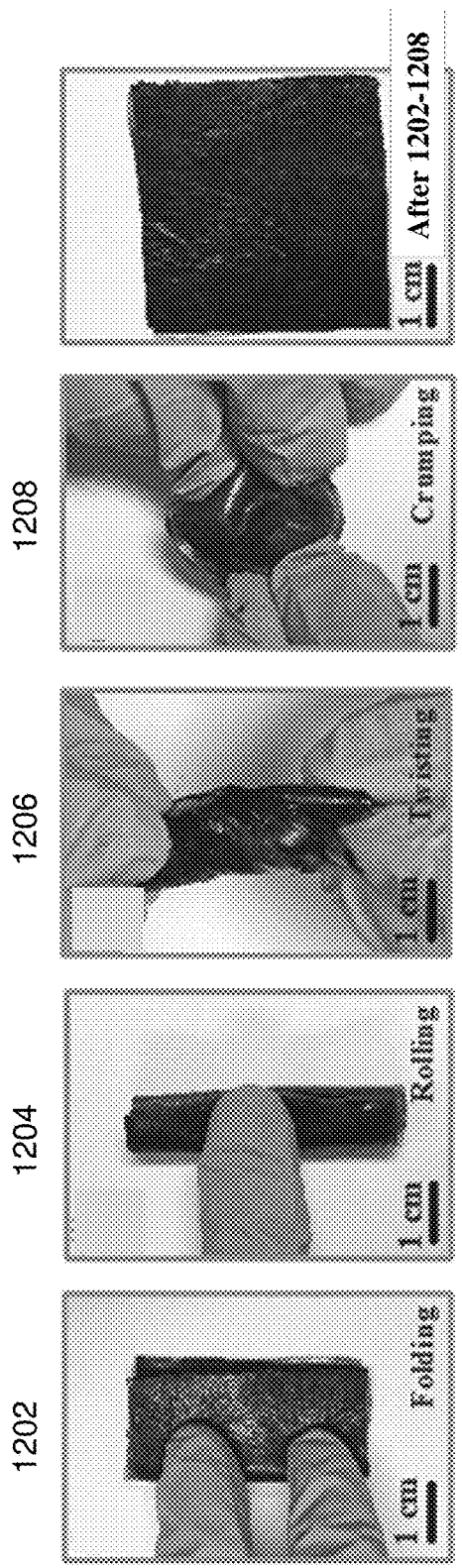
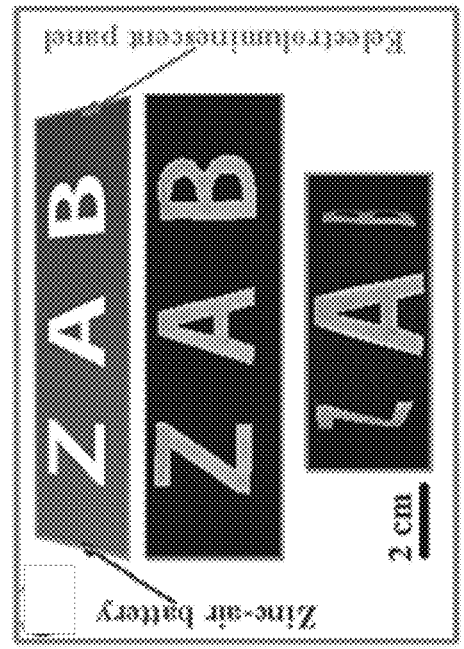
Fig. 12A
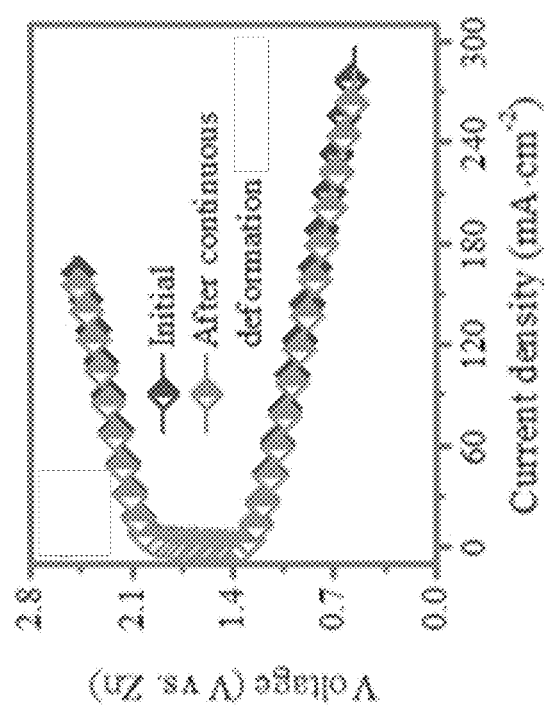
Fig. 12C
Fig. 12B

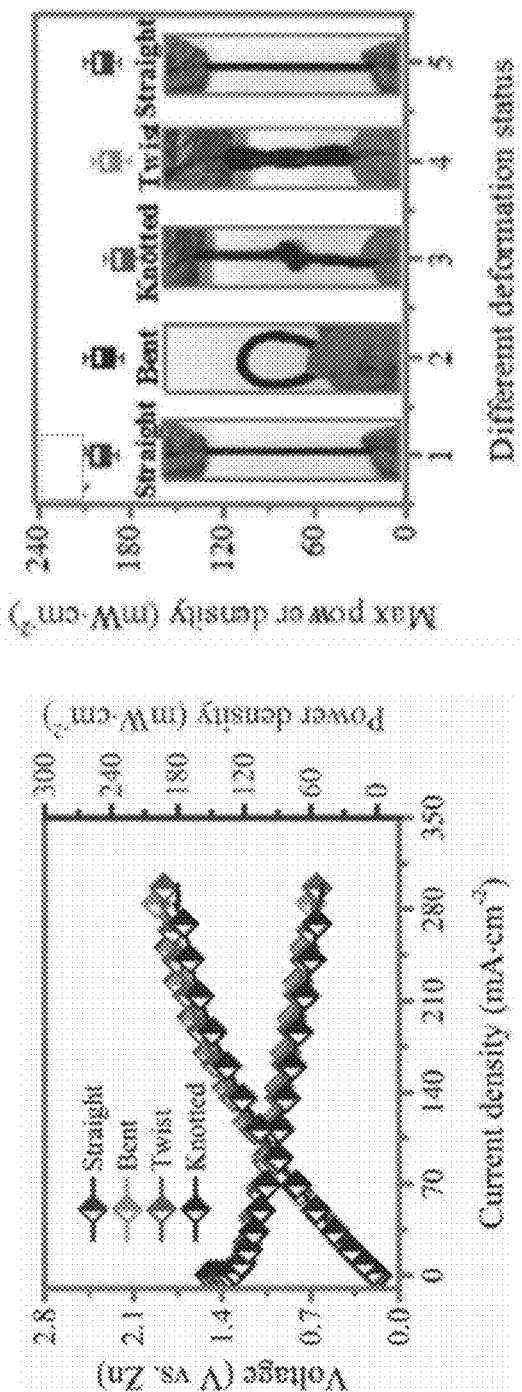
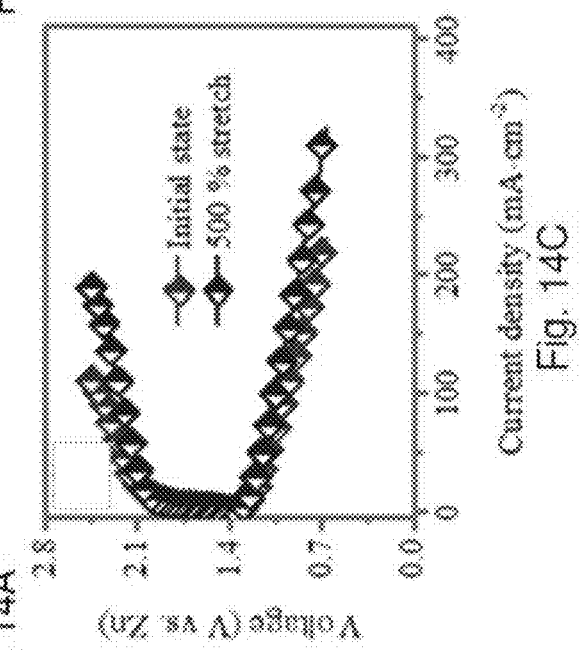
Fig. 14A
Fig. 14B
Fig. 14C

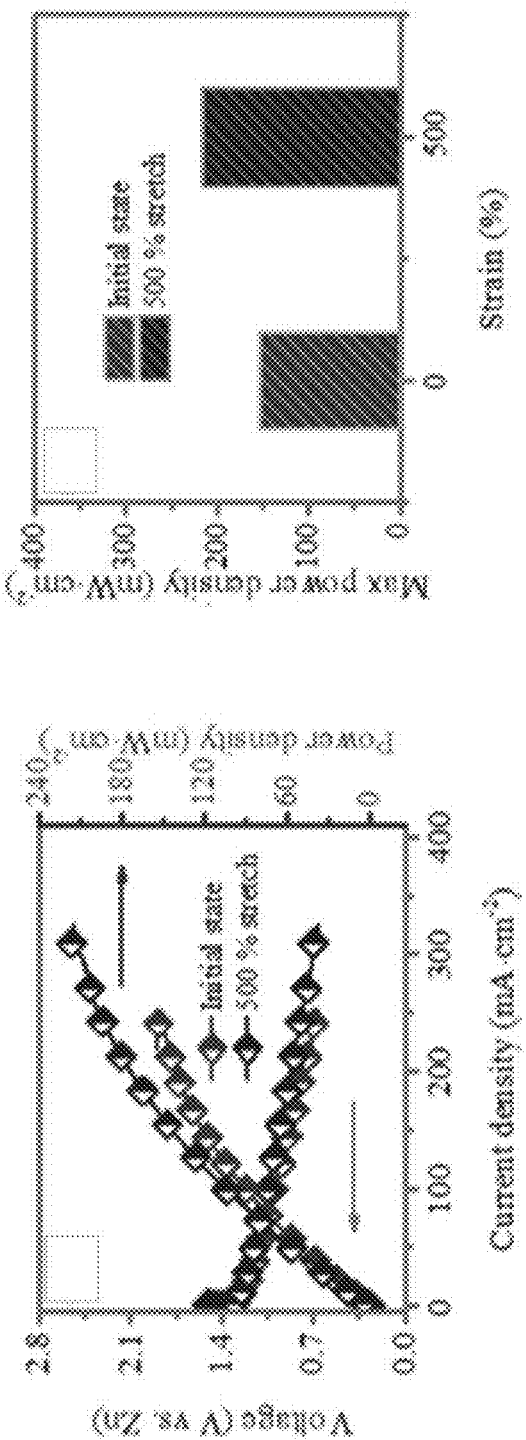
Fig. 14D
Fig. 14E
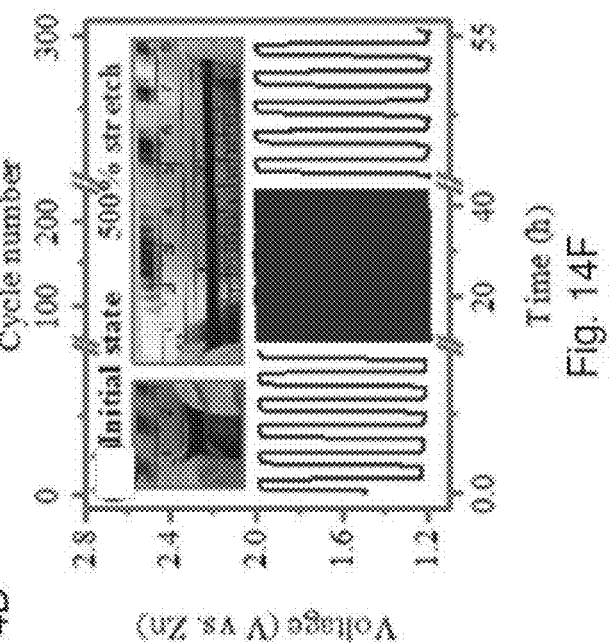
Fig. 14F

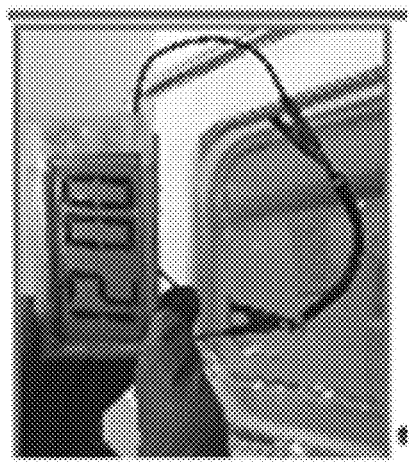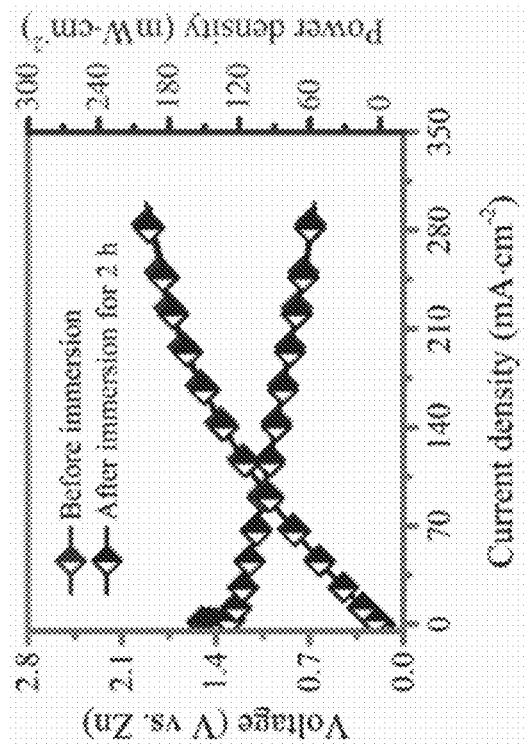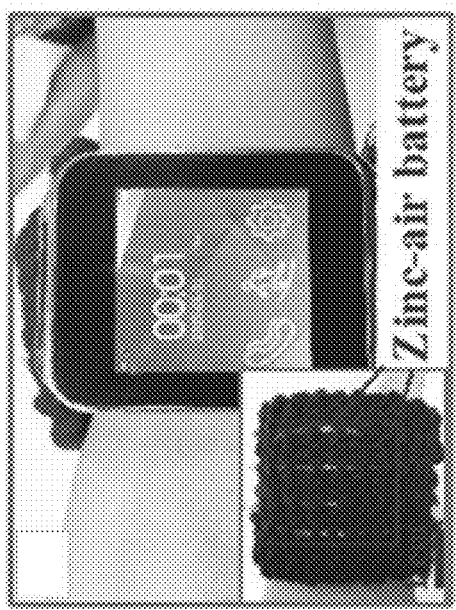
Fig. 15A
Fig. 15B
Fig. 15C

HYDROGEL ELECTROLYTE HAVING MULTIPLE CROSSLINKED STRUCTURES AND AN ENERGY STORAGE DEVICE INCLUDING SUCH ELECTROLYTE

TECHNICAL FIELD

The present invention relates to an electrolyte and a method of preparing the same, in particular, but not exclusively, to an electrolyte used in an energy storage device that can physically deform upon subjecting to an external mechanical load and a method of preparing said electrolyte. The present invention also relates to an energy storage device including said electrolyte.

BACKGROUND

Flexible and wearable devices are growing in use and are starting become more mainstream. Flexible and wearable devices are being incorporated into wearable products that are also starting to become more popular and are starting to gain wider usage.

A wearable energy source is a requirement for any wearable device. Wearable energy source devices have attracted tremendous attention due to the rapid development of wearable electronics. Examples of wearable power source may include supercapacitors or some particular batteries.

SUMMARY OF THE INVENTION

In accordance with the first aspect of the present invention, there is provided an electrolyte for use in an energy storage device, comprising: a polymer matrix of at least two crosslinked structures, including a first polymeric material and a second polymeric material; and an electrolytic solution retained by the polymer matrix; wherein the electrolyte is arranged to physically deform when subjected to an external mechanical load applied to the polymer matrix.

In an embodiment of the first aspect, the at least two crosslinked structures includes a first crosslinked structure defined by a plurality of polymer chains of the first polymeric material that form a chemical crosslink between each adjacent pair of polymer chains of the first polymeric material.

In an embodiment of the first aspect, the chemical crosslink includes at least one covalent bonds formed at a bonding site between the adjacent pair of polymer chains of the first polymeric material.

In an embodiment of the first aspect, the chemical crosslink further includes a crosslinking agent forming the at least one covalent bonds with the adjacent pair of polymer chains of the first polymeric material.

In an embodiment of the first aspect, the crosslinking agent is N,N'-methylenebisacrylamide.

In an embodiment of the first aspect, the at least two crosslinked structures includes a second crosslinked structure defined by a plurality of polymer chains of the second polymeric material that form a physical crosslink between at least one adjacent polymer chains of the first polymeric material.

In an embodiment of the first aspect, the physical crosslink includes an intertwining connection between adjacent polymer chains of the first polymeric material and the second polymeric material.

In an embodiment of the first aspect, the physical crosslink includes a hydrogen bond between adjacent polymer chains of the first polymeric material and the second polymeric material.

In an embodiment of the first aspect, the at least two crosslinked structures includes a third crosslinked structure including at least one covalent bonds formed between adjacent pairs of polymer chains of the first and the second polymeric materials.

In an embodiment of the first aspect, the first polymeric material is sodium polyacrylate.

In an embodiment of the first aspect, the second polymeric material is cellulose.

In an embodiment of the first aspect, the retained electrolytic solution including a zinc-based compound and an alkali.

In an embodiment of the first aspect, the zinc-based compound is an organic compound of zinc.

In an embodiment of the first aspect, the organic compound of zinc is zinc(II) acetate.

In an embodiment of the first aspect, the alkali is potassium hydroxide.

In an embodiment of the first aspect, the amount of the second polymeric material is 2.7% by mole percentage of monomer of the first polymeric material.

In an embodiment of the first aspect, the electrolyte can elastically deform in a way of rolling, folding, twisting, or crumpling without mechanical or structural damage.

In an embodiment of the first aspect, the electrolyte has a strain of at least 1000%.

In an embodiment of the first aspect, the electrolyte has an ion conductivity of $0.28$ $S \cdot cm^{-1}$.

In accordance with the second aspect of the present invention, there is provided an energy storage device, comprising: a first electrode and a second electrode, the first and the second electrode being spaced apart from each other, an electrolyte disposed between the first electrode and the second electrode, the electrolyte comprises a polymer matrix including at least two crosslinked structures having a first polymeric material and a second polymeric material; an electrolytic solution retained by the polymer matrix; and wherein the electrolyte is arranged to physically deform when subjected to an external mechanical load applied to the polymer matrix.

In an embodiment of the second aspect, the first electrode is an anode including a piece of zinc metal or a substrate deposited with zinc metal.

In an embodiment of the second aspect, the second electrode is a cathode including a substrate deposited with an active material.

In an embodiment of the second aspect, the substrate is selected from the group consisting of carbon nanotube paper, carbon cloth, carbon paper and nickel foam.

In an embodiment of the second aspect, the active material is Fe—N—C on porous carbon.

In an embodiment of the second aspect, the Fe—N—C on porous carbon is obtained by pyrolysis of Fe-ZIF-8 on graphene precursor at 700-1000° C.

In an embodiment of the second aspect, the at least two crosslinked structures include:
a first crosslinked structure defined by a plurality of polymer chains of the first polymeric material that form a chemical crosslink between each adjacent pair of polymer chains of the first polymeric material; a second crosslinked structure defined by a plurality of polymer chains of the second polymeric material that form a physical crosslink between at least one adjacent polymer chains of the first polymeric material; and a third crosslinked structure including at least one covalent bonds formed between adjacent pairs of polymer chains of the first and the second polymeric materials.

In an embodiment of the second aspect, the first polymeric material is sodium polyacrylate and the second polymeric material is cellulose.

In an embodiment of the second aspect, the device has a strain of at least 500%.

In an embodiment of the second aspect, the device can elastically deform while maintaining electrochemical performance of the device.

In an embodiment of the second aspect, the device can elastically deform in a way of folding, rolling, twisting, crumping, bending, or knotting without mechanical or structural damage while maintaining electrochemical performance of the device.

In an embodiment of the second aspect, the device maintains a stable charge-discharge performance at a current density of 5 mA·cm$^{-2}$ under a predetermined strain.

In an embodiment of the second aspect, the energy storage device is a rechargeable battery.

In an embodiment of the second aspect, the rechargeable battery is a flat-shaped battery or a fiber-shaped battery.

In accordance with the third aspect of the present invention, there is provided a method of forming an electrolyte for use in an energy storage device, comprising the steps of: forming a mixture of a first gel monomer, a neutralizer and a polysaccharide; adding a crosslinking agent into the mixture to form a blend; curing the blend at room temperature or a higher temperature; soaking the cured blend in an aqueous electrolytic solution.

In an embodiment of the third aspect, the first gel monomer is acrylic acid monomer, the polysaccharide is cellulose and the neutralizer is sodium hydroxide.

In an embodiment of the third aspect, the initiator is ammonium persulfate and the crosslinking agent is N,N'-methylenebisacrylamide.

In an embodiment of the third aspect, the aqueous electrolytic solution includes zinc(II) acetate and potassium hydroxide.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

The invention consists in the foregoing and also envisages constructions of which the following gives examples only. In the following description like numbers denote like features.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIG. 11A is a plot showing the charge-discharge curves of the flat-shape zinc-air battery of FIG. 10B with a strain from 0-800%.

FIG. 11B is a plot showing the power density curves corresponding to the charge-discharge curves in FIG. 11A.

FIG. 11C is a plot showing the maximum power density as a function of the tensile strain of the flat-shaped zinc-air battery of FIG. 10B. The inserts are the photos of the flat-shape zinc-air battery of FIG. 10B at a fully released state and 800% strain.

FIG. 12A is a series of photos showing the flat-shaped zinc-air battery of FIG. 10B being subjected to different mechanical deformation and sequentially released.

FIG. 12B is a plot showing the discharge-charge curves of the flat-shape zinc-air battery before and after continuous deformation in FIG. 12A.

FIG. 12C shows a flexible battery-display system (size: 18*5 cm) under original and bending conditions formed by attaching two batteries after subjecting to continuous deformation in FIG. 12A, connected in series on the back of an electroluminescent panel

FIG. 14A is a plot showing the charge-discharge curves of the fiber-shaped zinc-air battery of FIG. 13A under different deformation conditions.

FIG. 14B is plot showing the maximum power density of fiber-shaped zinc-air battery of FIG. 13A under different deformation conditions. The inserts are the photos of the fiber-shaped zinc-air battery under different deformation conditions.

FIG. 14C is a plot showing the charge-discharge curves of the fiber-shaped zinc-air battery of FIG. 13B at fully released state and 500% tensile strain.

FIG. 14D is a plot showing the power density curves of the fiber-shaped zinc-air battery corresponding to FIG. 14C.

FIG. 14E a plot showing maximum power density of the fiber-shaped zinc-air battery of FIG. 13B as a function of the tensile strain.

FIG. 14F is a plot showing the cycling test of the fiber-shaped zinc-air battery of FIG. 13B for rechargeability at a current density of 5 mA·cm$^{-2}$ under 500% strain. The insert is the photos of the fiber-shaped zinc-air battery at a fully released state and 500% strain.

FIG. 15A is a plot showing the discharge-charge curves of the fiber-shaped zinc-air battery of FIG. 13B before and after immersion in water.

FIG. 15B is a photo showing the fiber-shaped zinc-air battery being partially immersed in water to power an electric watch.

FIG. 15C is the photos of the fiber-shaped zinc-air batteries of FIG. 13B being woven into a wristband to power a smart watch.

DETAILED DESCRIPTION OF THE PREFERRED EMBODIMENTS

Without wishing being to be bound by theory, the inventors have, through their own research, trials and experiments, devised that flexible electronics may be used in a variety of applications in healthcare, military, and other applications. For example, flexible electronics may be used in wearable electronic device components and devices (i.e. wearable electronics), which may include smart fabric materials in the wearable electronics. Preferably, devices including garments made with smart fabrics may be used in a variety of applications such as healthcare to replace bulky instruments and bulky electronic components.

One example of an energy storage device for flexible/wearable electronics is zinc-air battery which may include advantages such as having a much higher energy density of 1086 Wh·kg$^{-1}$ as compared with lithium-ion batteries, therefore may be used in long-lasting power system. Zinc-air batteries may also be low cost for scaling up as a result of the water-free and/or oxygen-free environment for assembling the zinc-air battery.

Zinc-air battery requires strong alkali as electrolyte to operate. Nevertheless, this renders the loss of stretchability of hydrogels that may be used as a component in flexible energy storage device. Thus it may be preferable to provide an alkaline-tolerant hydrogel electrolyte with high stretchability and excellent ion transport capability for zinc-air battery.

In accordance with an example embodiment of the present invention, there is provided an alkaline-tolerant, highly stretchable polymeric electrolyte, which may be used in different alkaline electrolyte-based energy conversion and storage devices, such as nickel-zinc, cobalt-zinc, manganese-zinc, zinc-air batteries, etc. to enhance their stretchability, mechanical durability and wearability.

Figure 1:
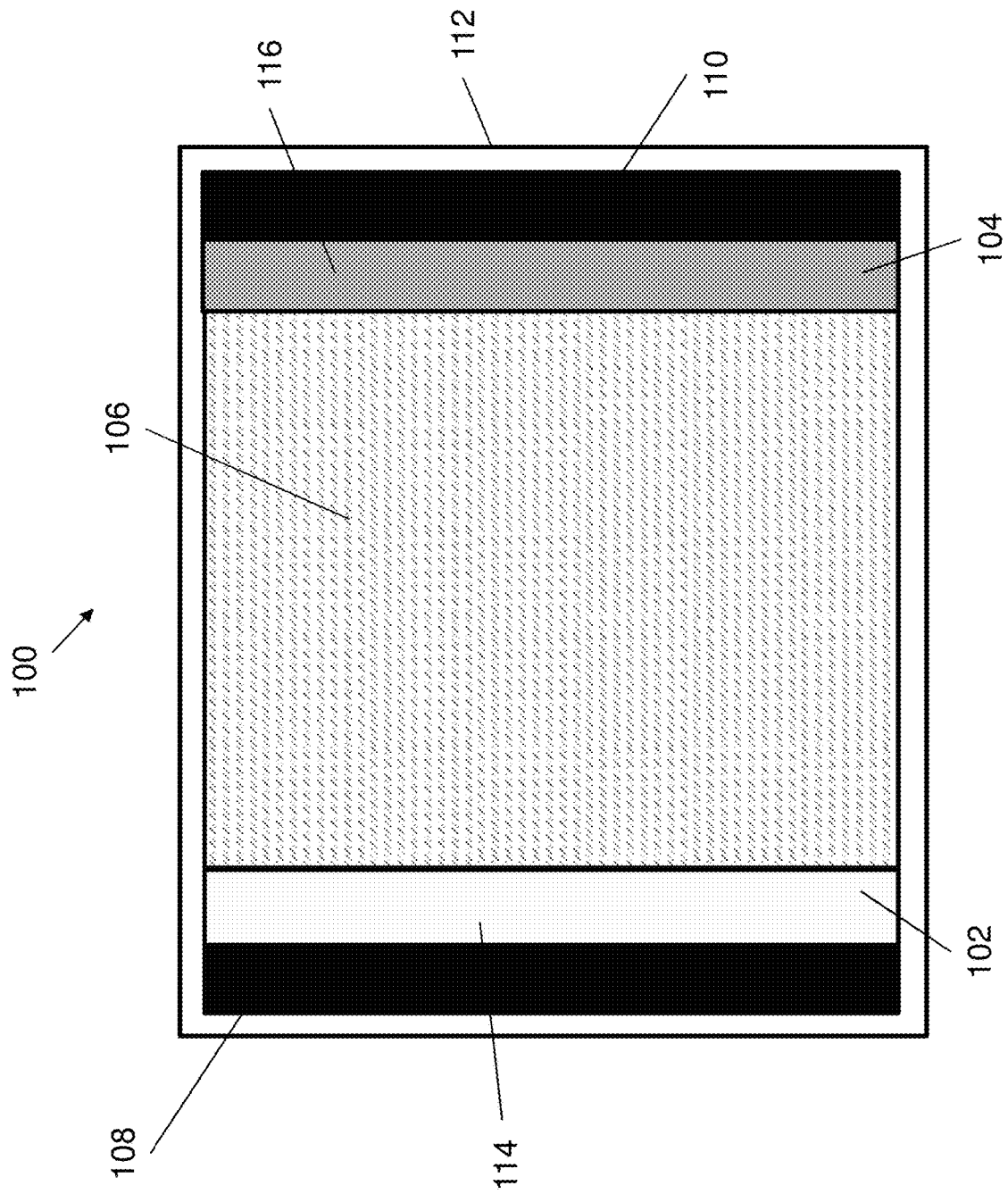
FIG. 1 illustrates an embodiment of an exemplary energy storage device.

With reference to FIG. 1, there is shown an exemplary embodiment of an energy storage device 100. The energy storage device 100 may be of any form that can capture energy produced at one time for use at a later time. In this example, the energy storage device is a battery, in particular a rechargeable battery. The battery 100 may also be of any suitable form that fits a particular application. In one example, the energy storage device may be a flat-shaped battery. In another example, the energy storage device may be a fiber-shaped battery. Both of which may be substantially physically deformed upon subjecting to external mechanical loads while maintaining the electrochemical performance.

In this embodiment, the battery 100 comprises a first electrode 102 and a second electrode 104 being spaced apart from each other and an electrolyte 106 disposed between the first electrode 102 and the second electrode 104. An electrolyte 106 is sandwiched between and is electrically coupled with the first electrode 102 and the second electrode 104.

Optionally, the battery 100 may also include substrates 108, 110 which may provide mechanical supports to the anode and/or the cathode electrodes 102, 104. The substrates may also operate as a current collector to associate with the first electrode 102 and the second electrode 104 respectively. For example, the substrates may be electrically conductive and may be bonded to external electrical wires to deliver electrical energy to external electronic devices.

The battery 100 may optionally include an encapsulation 112 that that receives and encases the first electrode 102, second electrode 104 and the electrolyte 106. The encapsulation 112 may be formed in any suitable shape such as for example a cylinder or a planar shape or any other suitable shape. The encapsulation 112 may be formed from a suitable material such as epoxy or a polymer.

In one example embodiment, the first electrode 102 functions as an anode and the second electrode 104 functions as a cathode of the battery 100. In operation there is a charge transfer between the anode 102 and the cathode 104 in order to convert chemical energy to electrical energy. The anode 102 and the cathode 104 are preferably being flexible. The anode 102 and cathode 104 are arranged in a suitable arrangement dependent on the desired shape of the battery 100.

With reference to FIG. 1, the first electrode 102 (i.e. anode) comprises a substrate 108 with a metal or metal compound 114 disposed on the substrate 108. The substrate 114 may be any suitable material. In one example the substrate 114 is a carbon nanotube (CNT) paper. Alternatively the substrate 108 may be selected from carbon cloth, carbon paper or nickel foam. The substrate 108 may have some electrical conductance but is preferably robust enough to function within an electrolyte. The anode 102 preferably comprises zinc metal 114 that is deposited onto the substrate 108. The substrate 108 provides a base layer for the zinc to be deposited onto. The zinc is deposited to form a substantially thick layer of zinc 114. The thickness may depend on the operational life of the battery 100.

Alternatively the anode 102 may comprise a ribbon or a sheet of zinc metal. That is, the anode 102 may not include an additional substrate 108 and may include a piece of zinc metal. The zinc metal may be a flexible ribbon or a flexible sheet of zinc metal. The zinc metal is arranged in a suitable configuration based on the desired shape of the battery 100.

The second electrode 104 (i.e. cathode) comprises a substrate 110 with an active material 116 disposed on the substrate. The substrate 110 may be similar in construction to the anode substrate 108. In one example the substrate 110 i.e. cathode substrate 110 comprises a carbon nanotube paper. Alternatively the substrate may be a carbon cloth, carbon paper or nickel foam. The cathode substrate 110 comprises an electrocatalyst 116 disposed on the substrate 110. Preferably the cathode 104 comprises Fe—N—C on porous carbon disposed on the substrate 110. The electrocatalyst 116 (i.e. Fe—N—C on porous carbon) may have a two-dimensional structure, providing abundant active sites which are advantageous in electrocatalytic activity (i.e. converting chemical energy to electrical energy).

Preferably, the electrolyte 106 may be a polymeric electrolyte disposed between the first electrode 102 and the second electrode 104. The polymeric electrolyte 106 may be a hydrogel electrolyte that is viscous enough to be formed into a shape and retain the shape it is formed into. For example, the electrolyte 106 may be formed into any one of an elongated shape, a planar shape, a tubular shape or any suitable shape. The electrolyte 106 is also capable of being retained within the battery 100 by being sandwiched between the electrodes 102 and 104.

The electrolyte 106 is arranged to physically deform when subjected to an external mechanical load applied to the battery 100, thereby allowing the battery 100 to maintain its electrochemical performance. For example, the battery 100 may elastically deform in a way of folding, rolling, twisting, crumping, bending, or knotting without mechanical or structural damage while maintaining the electrochemical performance.

Figure 2:
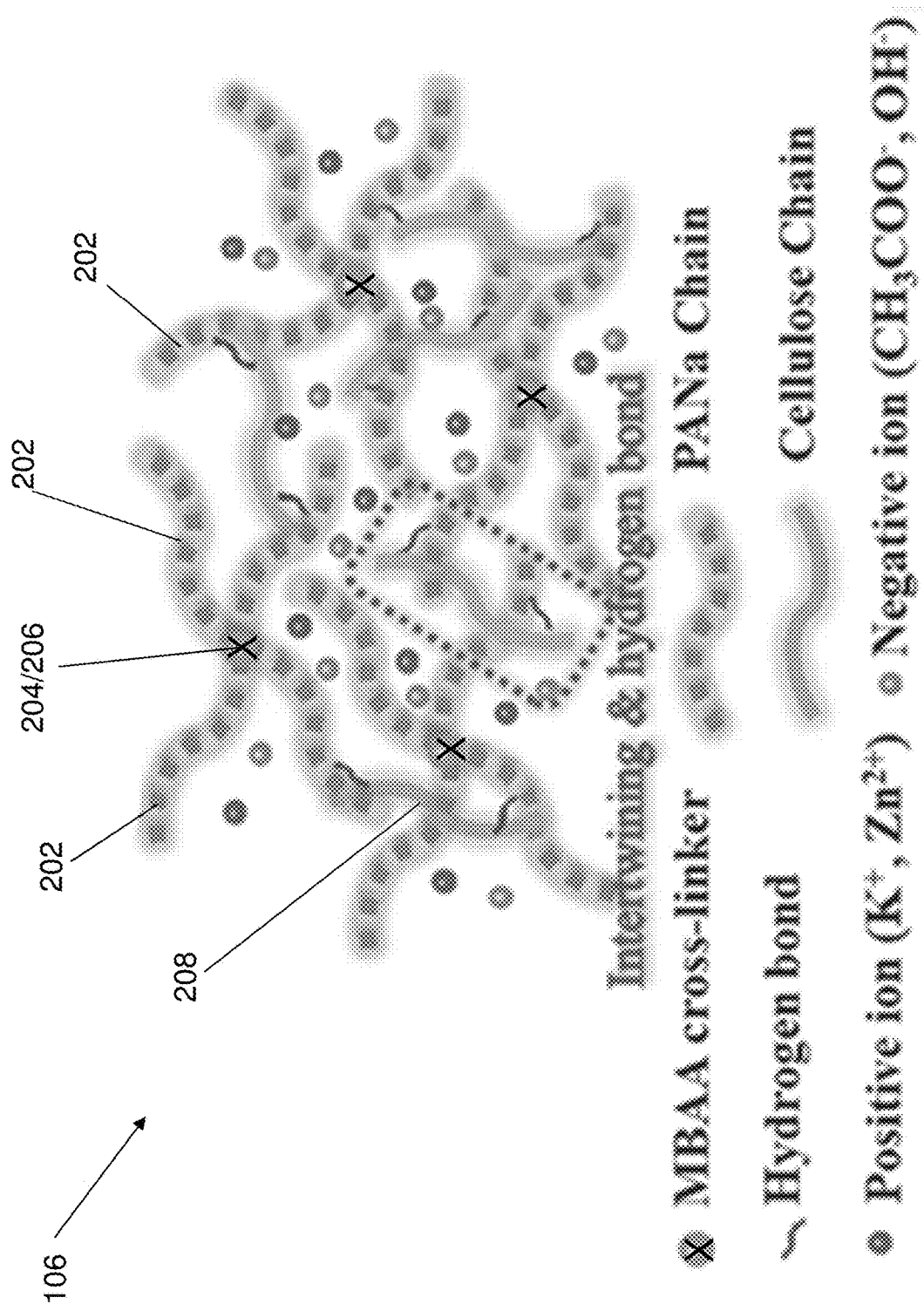
FIG. 2 illustrates the crosslinked structures within the electrolyte of the energy storage device of FIG. 1.

With reference to FIG. 2, the electrolyte 106 comprises a polymer matrix 200 including at least two crosslinked structures having a first polymeric material and a second polymeric material. In this example, the first and the second polymeric material are sodium polyacrylate (PANa) and cellulose respectively, which combine and form a hydrogel material that may be used as an electrolyte in a battery.

Preferably, the polymer matrix may include at least a first crosslinked structure and a second crosslinked structure. Each of the crosslinked structures may be defined by a plurality of polymer chains of the first or the second polymeric material. The polymer chains may interact with each other so as to allow the electrolyte to physically deform upon subjecting to an external mechanical load applied to the polymer matrix.

Referring to FIG. 2, the first crosslinked structure is defined by a plurality of polymer chains of the first polymeric material 202 that form a chemical crosslink between each adjacent pair of polymer chains of the first polymeric material 202. The chemical crosslink may include at least one covalent bonds formed at a bonding site 204 between the adjacent pair of polymer chains of the first polymeric material 202.

For example, the chemical crosslink may include a crosslinking agent 206, such as methylenebisacrylamide (MBAA) crosslinker, which forms at least one covalent bonds with each of the adjacent pair of polymer chains of the first polymeric material 202 or PANa. Preferably, the crosslinking agent may act as an anchor for bonding the adjacent pair of polymer chains of the first polymeric material together so as to strengthen the robustness of the structure. That is, the first crosslinked structure comprises a plurality polymer chains of the first material covalently bonded together via a crosslinking agent.

Alternatively, the adjacent pair of polymer chains of the first polymeric material 202 may be crosslinked by one or more covalent bonds formed directly between molecules in each of the polymer chains of the first polymeric material 202 at one or more bonding sites 204, or other suitable crosslinker may be used to form additional chemical crosslinks between the two adjacent polymer chains.

The second crosslinked structure is defined by a plurality of polymer chains of the second polymeric material 208 that form a physical crosslink between at least one adjacent polymer chains of the first polymeric material 202. For example, the physical crosslink may include any reversible crosslinking interaction known in the art such as chain entangling, hydrogen bond, hydrophobic interaction, crystallite formation, etc. Preferably, the physical crosslink includes an intertwining connection between the adjacent pair of polymer chains of the first polymeric material 202 and the second polymeric material 208, a hydrogen bond between adjacent pair of polymer chains of the first and the second polymeric materials, or a combination thereof. As such, the second crosslinked structure may dynamically interact with the first crosslinked structure which in turn promoting energy dissipation of the polymeric matrix 200 under stretching conditions and therefore enhancing the stretchablity of the electrolyte.

Optionally or additionally, the polymer matrix 200 may further include a third crosslinked structure, which may include at least one covalent bonds formed between adjacent pairs of polymer chains of the first polymeric material 202 and the second polymeric material 208. The adjacent pairs of polymer chains of the first and the second polymeric materials may form covalent bonds with or without an aid of a crosslinking agent. With the covalent crosslinking and physical crosslinking as mentioned above, a synergetic effect may be achieved which renders the electrolyte strengthened mechanical robustness and stretchability.

The polymeric matrix 200 is arranged to retain an electrolytic solution therein for ion conductivity. The electrolytic solution may include a metal-based compound and an alkali as additives within the electrolytic solution. In a preferred embodiment, the metal-based compound is a zinc-based compound, particularly an organic compound of zinc, preferably zinc(II) acetate whereas the alkali is potassium hydroxide. A skilled person may recognize any other suitable metal-based compounds and alkali according to their needs.

Referring to FIG. 2, there is shown an example structure of electrolyte 106 illustrating the crosslinked structures within the electrolyte. As mentioned above, the electrolyte 106 comprises a polymer matrix including at least two crosslinked structures. In this example, the polymer matrix includes a first crosslinked structure, a second crosslinked structure and a third crosslinked structure. Each of the crosslinked structures are defined by a plurality of polymer chains of sodium polyacrylate (PANa) (i.e. the first polymeric material) or cellulose (i.e. the second polymeric material).

The first crosslinked structure includes a plurality of PANa chains crosslinked together by forming covalent bonds with a crosslinking agent such as N,N'-methylenebisacrylamide (MBAA) at a particular bonding site. In particular, the bonding site is where the reaction of the carboxylate group of the PANa chains and the amide groups of MBAA to occur. The MBAA may act as an anchor to bridge the PANa chains and as a stress buffer center to dissipate energy and homogenize the PANa structure. The second crosslinked structure includes a plurality of cellulose chains forming physical crosslink with the PANa chains. As shown, the cellulose chains uniformly disperse in the polymer matrix, intertwining as well as forming hydrogen bonds with the PANa chains. The hydrogen bonds may act as reversible crosslinking points that can dynamically break and reform to dissipate mechanical energy upon subjecting to external mechanical loads such as stretching. The third crosslinked structure refers to the structure formed by the PANa chains and the cellulose chains covalently bonded together. The covalent bonds may be formed between the hydroxyl group of cellulose chains and carboxylate group of the PANa chains.

As mentioned above, the covalent crosslinking and physical crosslinking may achieve a synergetic effect that renders the electrolyte strengthened mechanical robustness and stretchability. The covalent bonds in the first and/or the third crosslinked structures may remain intact in response to the external mechanical loads, maintaining the structure of the electrolyte; whereas the physical crosslink in particular the hydrogen bonds between the first and the second crosslinked structures may break in response to the mechanical loads, and reform when the load is removed, promoting mechanical energy dissipation and polymer network homogenization. In one example, the electrolyte 106 may elastically deform in a way of rolling, folding, twisting, or crumpling without mechanical or structure damage. In another example, the electrolyte 160 may have a strain of at least 1000%. Examples of deforming/stretching of the battery 100 or the polymer matrix 200 will be further discussed in the later parts of disclosure.

The polymer matrix 200 also includes a plurality of positive ions and negative ions within the matrix. These ions are obtained from the electrolytic solution including zinc(II) acetate and potassium hydroxide retained by the polymer matrix. The positive ions ($K^+$ and $Zn^{2+}$) and negative ions ($CH_3COO^-$ and $OH^-$) may strengthen the ion conductivity of the electrolyte. In one example, the electrolyte 160 may have an ion conductivity of 0.28 $S\cdot cm^{-1}$. As appreciated by a person skilled in the art, chemical ions of other combinations may be trapped in the hydrogel structure when a different electrolytic solution is retained in the polymer matrix.

Figure 3:
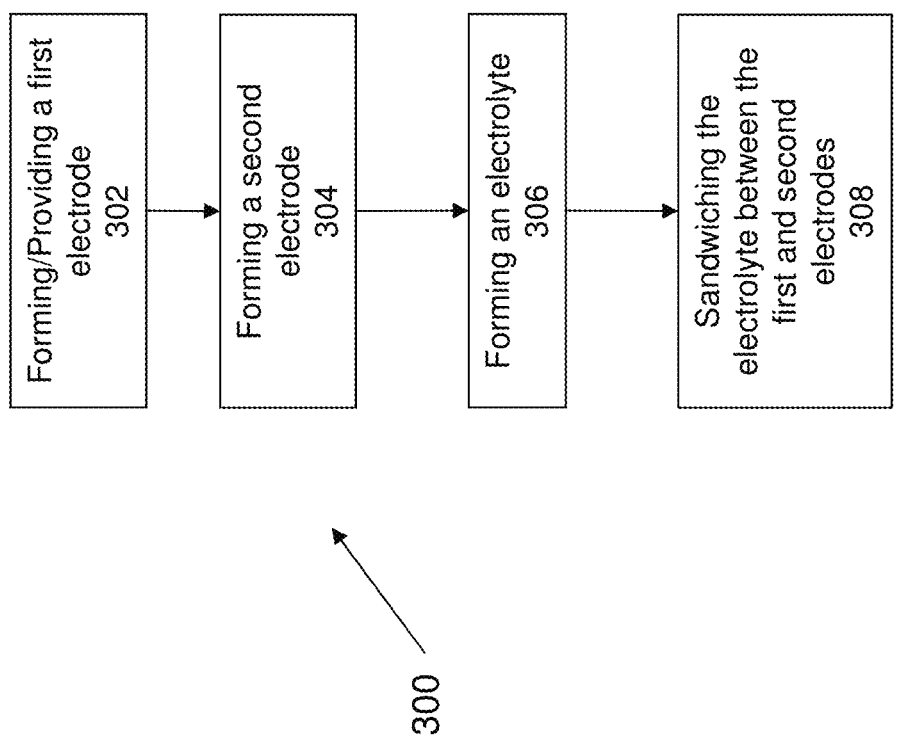
FIG. 3 shows an embodiment of a method of forming the energy storage device of FIG. 1.

With reference to FIG. 3, there is shown a method 300 of forming an energy storage device that comprises the aforementioned electrolyte. The method 300 is a generalized method of forming a rechargeable battery that includes the aforementioned electrolyte and has a strengthened mechanical robustness and stretchability.

The method commences at step 302. Step 302 comprises forming or providing a first electrode. The first electrode may be an anode that is formed by depositing a zinc metal onto a substrate. The substrate is preferably a carbon nanotube (CNT) paper. Alternatively the substrate may be selected from carbon cloth, carbon paper or nickel foam. The substrate provides a base layer for the zinc to be deposited onto. The zinc is deposited to form a substantially thick layer of zinc. The thickness may depend on the operational life of the battery. In this example, the anode is fabricated by depositing zinc metal onto CNT films. The deposition process is carried out in by electroplating zinc metal onto a CNT film in a two-electrode setup. CNT film is used as a working electrode, zinc plate (purity>99.99%, Sigma) is used as both anode and counter electrode, 0.5M $ZnSO_4$ is used as electrolyte. The Electroplating process is carried out at −0.9 V vs. Zzinc plate for 600 s using an electrochemical workstation.

Alternatively the first electrode may comprise a ribbon or a sheet of zinc metal. That is, the first electrode may not include an additional substrate and may include a piece of zinc metal. The zinc metal may be a flexible ribbon or a flexible sheet of zinc metal. In a preferred embodiment, the first electrode is a zinc spring.

Step 304 comprises forming a second electrode. The second electrode (i.e. cathode) comprises a substrate with an active material disposed on the substrate. The substrate is preferably a CNT paper disposed with an electrocatalyst. Alternatively the substrate may be a carbon cloth, carbon paper or nickel foam. The electrocatalyst preferably is a Fe—N—C on porous carbon. The electrocatalyst may be prepared by any suitable method. In one example, the electrocatalyst (i.e. Fe—N—C on porous carbon) is obtained by subjecting Fe-ZIF-8 on graphene precursor to a pyrolysis process at 700-1000° C. In this example, the cathode is fabricated by spraying a slurry of electrocatalyst on a CNT paper, followed by drying the as-fabricated cathode at room temperature for 24 h. The electrocatalyst slurry is prepared by dispersing 8 mg of electrocatalysts into 1 mL of mixture solution of 2-propanol, distilled water, and Nafion solution (5 wt %) with a ratio of 10:40:1.

Step 306 comprises forming an electrolyte. The electrolyte may be formed using any suitable method. In this example, the electrolyte is a PANa-cellulose hydrogel. The electrolyte preferably is formed using the same steps as method 400 that will be described later.

Step 308 comprises sandwiching the electrolyte between the first electrode and the second electrode. The sandwiching process may depend on the shape of the battery. In one example, the battery is a flat-shaped battery. The electrolyte may be first pre-stretched to a predetermined strain. Then the electrodes are directly attached or layered on each side of the pre-stretched electrolyte. In an alternative example, the battery is a fiber-shaped battery. The pre-stretched electrolyte may be coated or wrapped onto the anode, followed by coating or wrapping the cathode on the electrolyte. The coating process may be performed by any suitable methods.

Figure 4:
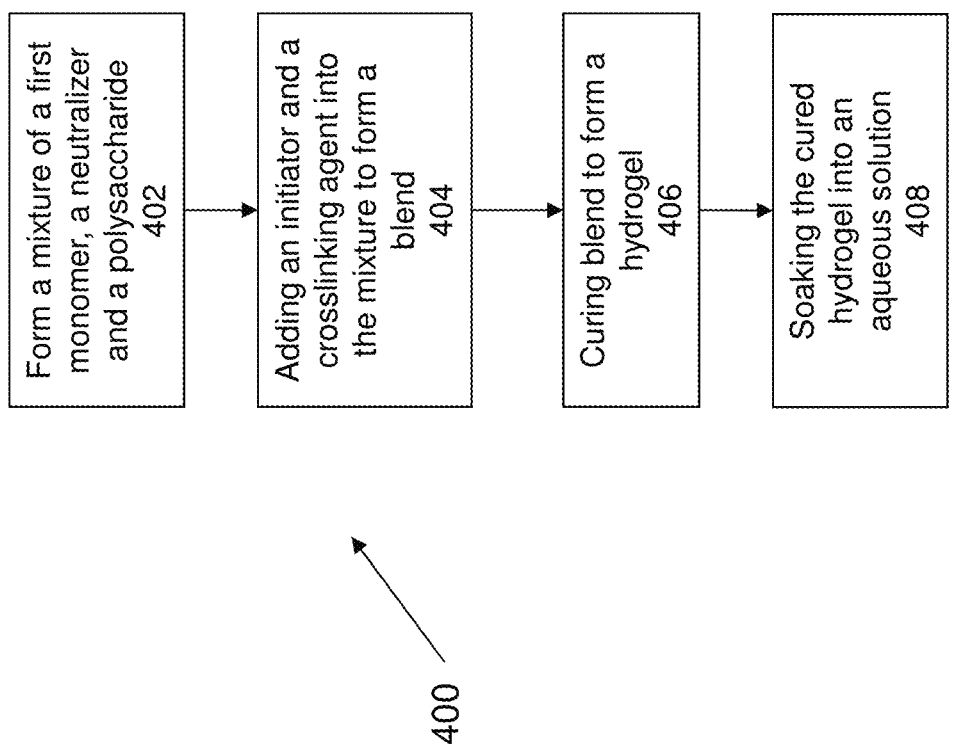
FIG. 4 shows an embodiment of a method of forming the hydrogel electrolyte in the energy storage device of FIG. 1.

With reference to FIG. 4, there is shown an example of a method 400 of forming the electrolyte 106. The method commences at step 402. Step 402 comprises forming a mixture of a first gel monomer, a neutralizer and a polysaccharide. In this example where the electrolyte is a PANa-cellulose hydrogel, the first gel monomer is acrylic acid monomer, the polysaccharide is cellulose and the neutralizer is sodium hydroxide. The mixture is formed by slowly adding 7.2 mL of acrylic acid monomers (98%, AA) into 10 mL of carboxymethyl cellulose gel (1.69%, CM-cellulose) under vigorous stirring until a uniformly translucent solution is obtained, followed by slowly adding 5 mL of 20M sodium hydroxide dropwise to the translucent solution under vigorous stirring. The neutralizer and the polysaccharide may act together to improve the alkaline tolerance of the electrolyte.

Step 404 comprises adding an initiator and a crosslinking agent into the mixture to form a blend. In one example, the initiator is ammonium persulfate and the crosslinking agent is MBAA with a concentration preferably of 0.2%. In this example, 110 mg of ammonium persulfate (APS) and 4 mg of N,N'-methylenebisacrylamide (MBAA) are added into the as-obtained translucent solution and stirred for 0.5 h at room temperature.

At step 406, the blend obtained at step 404 is cured to form a hydrogel. The curing process may be performed at room temperature or a higher temperature to allow polymerization. In this example, the fabrication process may also include a step of degassing with nitrogen. The blend may be cured in a planar or column mold at a temperature of 60° C. for 10 h in order to allow free-radical polymerization. The as-prepared hydrogel may be peeled off and fully dried in an oven with a temperature of 80° C.

Finally, at step 408, the cured hydrogel is soaked into an aqueous electrolytic solution to promote ion conductivity of the electrolyte. In this example, the cured hydrogel may be soaked into an aqueous electrolytic solution containing zinc(II) acetate at a concentration of for example 0.2M and potassium hydroxide at a concentration of for example 6M for 30-180 minutes.

The characterization and performance of embodiments of the electrolyte and the energy storage device containing the electrolyte will now be discussed. The surface morphology of products was investigated by scanning electron microscope (SEM). The structure and chemical state of hydrogel was evaluated by fourier transform infrared spectroscopy (FT-IR). The tensile strain performance was tested using tensile machine.

The electrochemical performance tests were carried out in ways of charge-discharge polarization, A.C. impedance and galvanostatic tests. The charge-discharge polarization and A.C. impedance ranged from $10^5$ to $10^{-2}$ Hz with an amplitude of 5 mV, was determined using an electrochemical workstation. The galvanostatic test was conducted using a Land 2001A battery test system at room temperature.

The ionic conductivity (δ) was calculated by $$\delta = L/(Rb \cdot A)$$

where L is the thickness (cm), $R_b$ is the bulk resistance (U), and A is area ($cm^2$) of the polyelectrolyte.

The power density (P) of the zinc-air battery was calculated by $$P = I \cdot V$$

where I is the discharge current density and V is the corresponding voltage.

Figure 5:
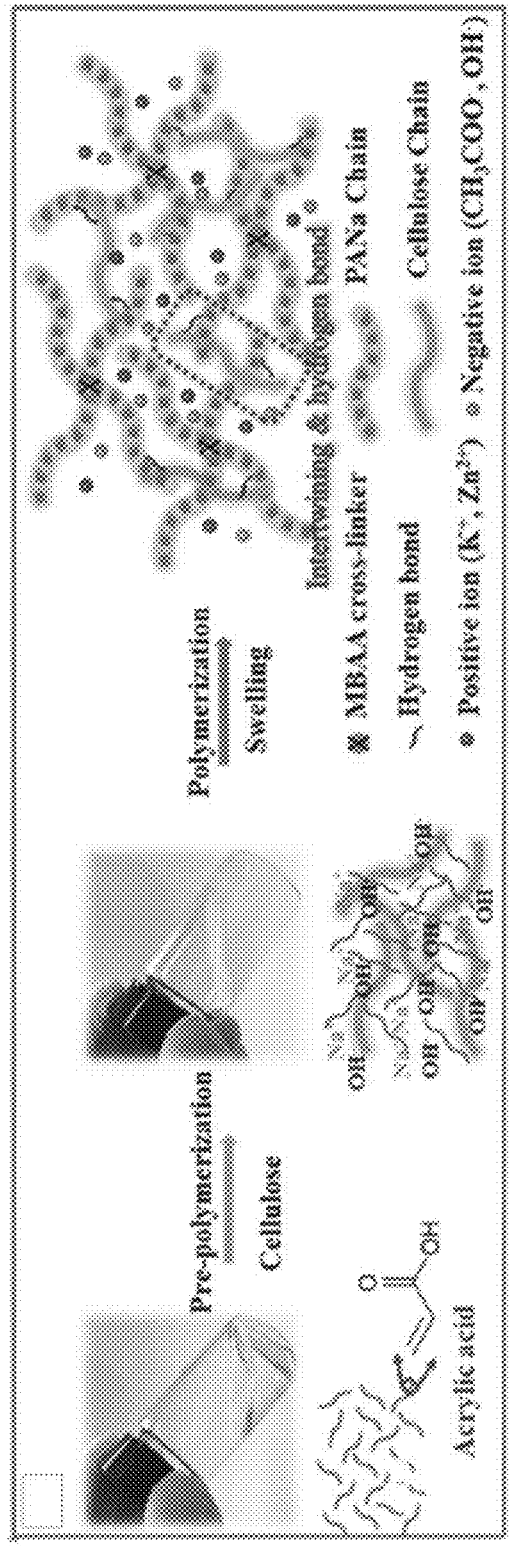
FIG. 5 is a schematic diagram showing the synthetic procedure of the PANa-cellulose hydrogel electrolyte.
Figure 6A:
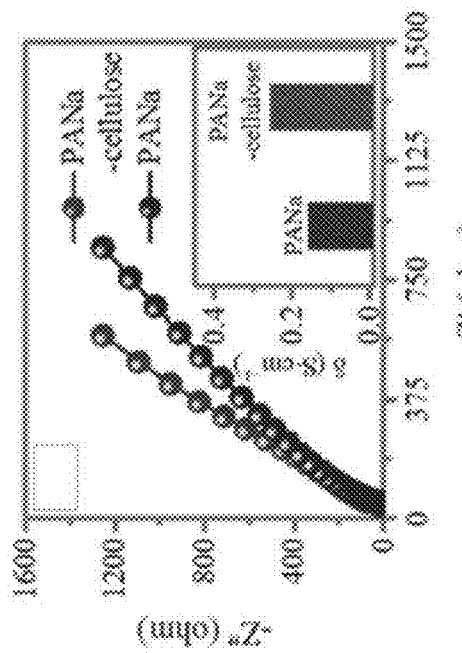
FIG. 6A shows the FT-IR spectra of freeze-dried PANa, cellulos and PANa-cellulose hydrogels.

With reference to FIG. 5, there is shown a specific example of forming a PANa-cellulose electrolyte using the aforementioned method 400. The PANa-cellulose electrolyte was synthesized through a free radical polymerization of acrylic acid (AA) monomers neutralized by NaOH solution in the presence of cellulose as an enhancer and MBAA as the crosslinkers, retaining an electrolytic solution containing zinc(II) acetate and potassium hydroxide. As mentioned above, the formed PANa-cellulose comprises a polymer matrix including at least two crosslinked structures. The crosslinked networks (i.e. structures) are both physically and chemically crosslinked. The covalent crosslinking is mainly formed between PANa and hydroxyl groups of cellulose chains, as well as between PANa and MBAA; whereas the physical crosslinking domains are formed by hydrogen bonds and chain entanglements (i.e. intertwining) between the PANa and cellulose chains. The synergetic effects of the covalent crosslinking between the PANa chains and the MBAA anchors (stress buffer centers to dissipate energy and homogenize the PANa network), as well as between the PANa and cellulose chains, and the physical entanglements as well as hydrogel bonds between the PANa and cellulose chains are responsible for the strengthened mechanical robustness and stretchability of the synthesized hydrogel. Moreover, the dynamical recombination of broken intermolecular hydrogen bonds can further promote energy dissipation and polymer network homogenization under stretching conditions, resulting in the superior stretchability. The physically and chemically crosslinking reactions of the PANa-cellulose hydrogel is corroborated by Fourier transform infrared spectroscopy (FT-IR) spectra (FIG. 6A). The FT-IR spectra of physically crosslinked cellulose shows obvious absorption peak at 3430 $cm^{-1}$, which is assigned to O—H stretching. The peaks at around 1160 and 1023 $cm^{-1}$ are attributed to asymmetric stretching vibration of C—O—C glycoside and C—O stretching in the C—OH stretching, respectively. The peak at 895 $cm^{-1}$ is related to C—O—C bridge. Compared to those in the spectra of PANa and cellulose hydrogel, the intensity of the aforementioned absorption peaks in the spectra of PANa-cellulose hydrogel significantly decreased, indicating that the hydroxyl group on the cellulose chains partially reacted with PANa chains to form covalent crosslinks. In addition, considering that the PANa-cellulose hydrogel is fabricated through free radical polymerization of PANa in the presence of cellulose network, strong hydrogen bonds may exist between the PANa and cellulose chains in the hydrogel backbones.

As shown in FIG. 5, there is also a plurality of $Na^+$ cations on the surface of PANa and carboxyl anions in cellulose chains. The presence of these abundant $Na^+$ cations leads to electrostatic interactions between the PANa and cellulose chains. Moreover, the transitive ions ($Na^+$ and $OH^-$) connect with the PANa and cellulose chains by hydrogen bonds, which could provide the transport paths for electrolyte ions.

Figure 6B:
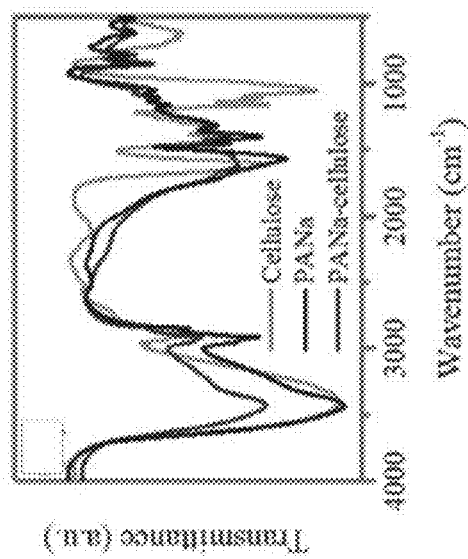
FIG. 6B shows the A.C. impedance of the as-synthesized PANa and PANa-cellulose polyelectrolyte. The insert is the ionic conductivity of the PANa and PANa-cellulose polyelectrolyte calculated from FIG. 6B.

The 6M KOH aqueous solution with 0.2M $Zn(CH_3COO)_2$ additives are absorbed to fortify ionic conductivity of the PANa-cellulose hydrogel. The ion conductivity of PANa and PANa-cellulose hydrogel with 300% swelling ratio is evaluated by A.C. impedance spectra (FIG. 6B). As shown, the ion conductivity of PANa polyelectrolyte increases from 0.15 to 0.28 $S·cm^{-1}$. The enhancement is attributed to cellulose which helps the polyelectrolyte to contain a higher concentration of alkaline electrolyte ions and $OH^-$ ions that provide ion transport paths by connecting the cellulose chains.

Figure 6C:
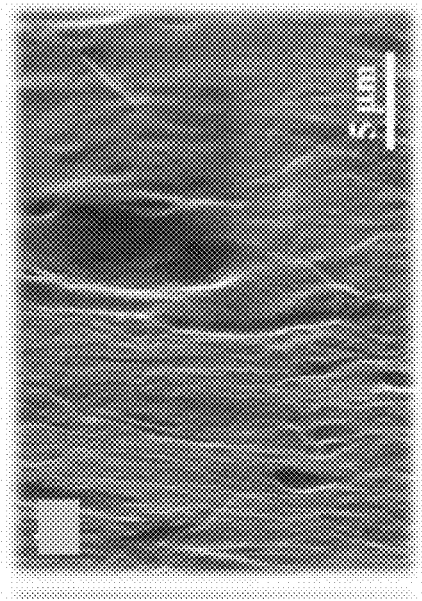
FIG. 6C is a SEM image showing the cross-section of the freeze-dried PANa-cellulose hydrogel.
Figure 6D:
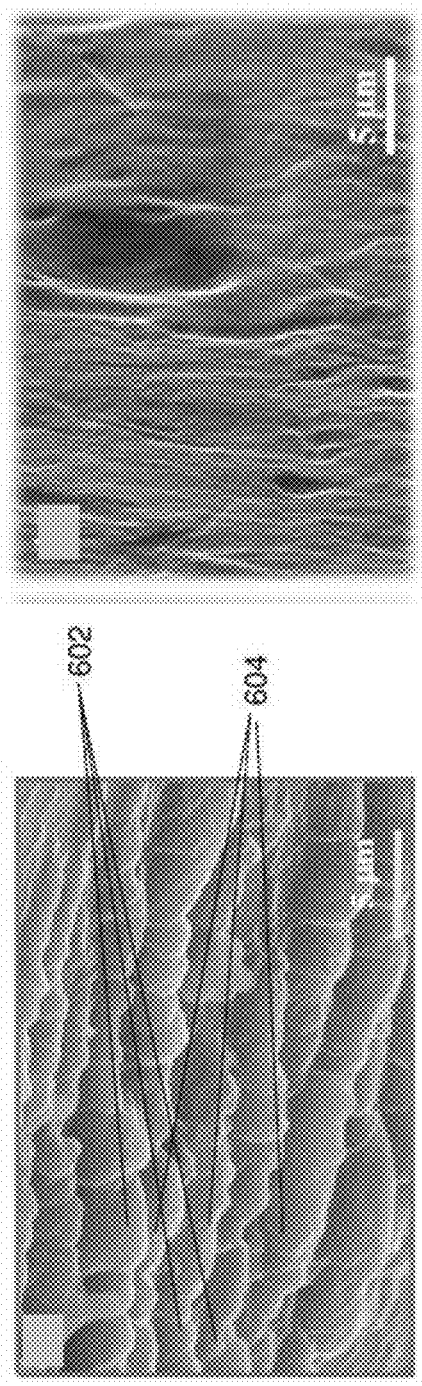
FIG. 6D is a SEM image of the freeze-dried carboxymethyl cellulose.

The microstructure of the PANa-cellulose hydrogel is investigated by scanning electron microscopy (SEM). SEM image of cross-section of the freeze-dried PANa-cellulose hydrogel exhibits a hierarchical structure (FIG. 6C), similar to that of cellulose (FIG. 6D). The PANa-cellulose hydrogel was characterized by an increase of basal spaces 602 and porous channels 604, which could further improve water-retention and ion conductivity of the hydrogel.

Figure 7A:
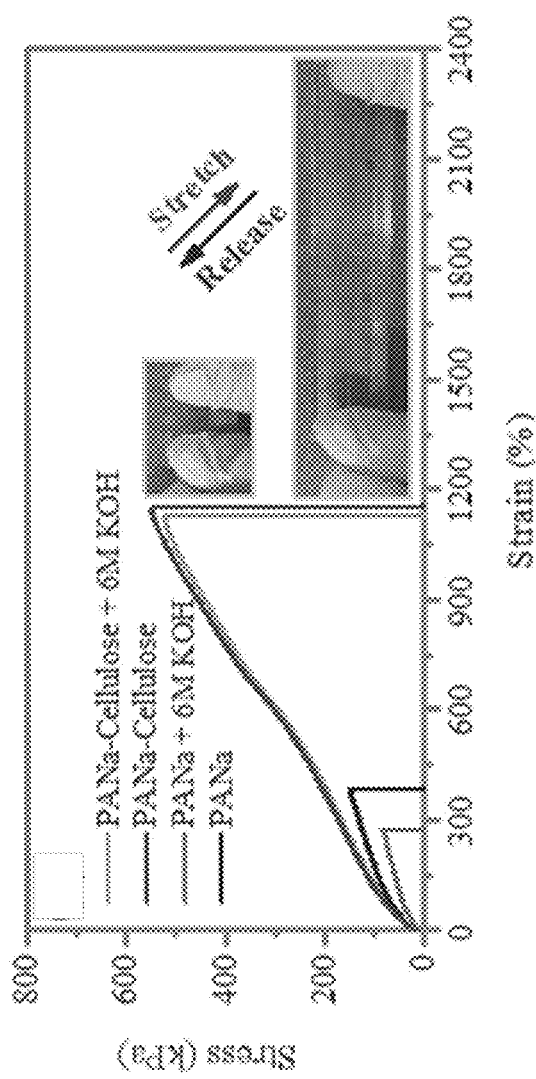
FIG. 7A a plot of tensile stress versus strain curves of the as-synthesized PANa and PANa-cellulose hydrogel electrolyte with and without 300% 6M KOH+0.2M Zn(CH$_3$COO)$_2$ intake. The inserts are optical photos of the relaxed and elongated states of the 300% 6M KOH+0.2M Zn(CH$_3$COO)$_2$ solution incorporated PANa-cellulose polyelectrolyte showing excellent stretchability.

The mechanical properties of the developed dual network hydrogel are investigated by tensile tests. With reference to FIG. 7A, in an example embodiment of a polymer matrix of the first polymeric material and the second polymeric material having a particular mole ratio, i.e. the amount of the second polymeric material may be 2.7% by mole percentage of monomer of the first polymeric material, the elongation at fracture is significantly increased and the tensile strength is also much enhanced with the introduction of 2.7% of cellulose (vs. AA monomers, mol %).

The synthesized PANa-cellulose polyelectrolyte is easily stretched to over 1000% strain without any breakage or even visible cracks. Without the cellulose networks, the PANa polyelectrolyte only shows a 300% maximum strain and a low mechanical strength of 149 kPa. The comparison between stretchabilities of PANa and PANa-cellulose hydrogels containing 300% 6M KOH solution is conducted. The PANa-cellulose hydrogel maintains over 98% the maximum elongation and ultimate strength after the incorporation of 6M KOH solution, revealing extraordinary alkaline tolerant capability (FIG. 7A).

Figure 7B:
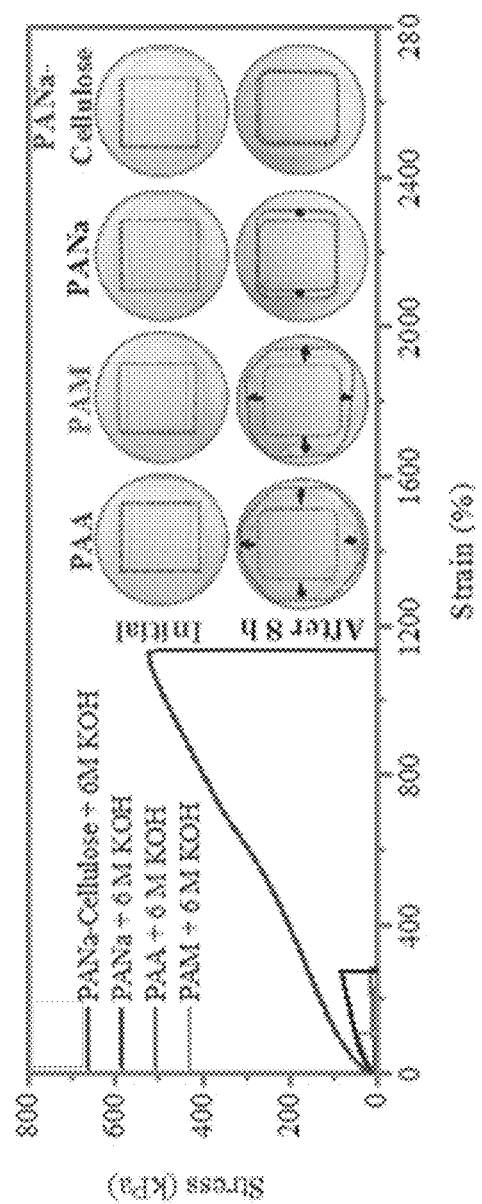
FIG. 7B shows the comparison of tensile properties of PAA, PAM, PANa and PANa-cellulose hydrogel under alkaline condition. The insert is the photos of PAA, PAM, PANa and PANa-cellulose hydrogel at initial state and containing 300% 6M KOH solution for 8 h. The two rectangles represent the shape of hydrogel before and after infiltrating alkaline solution respectively.
Figure 7C:
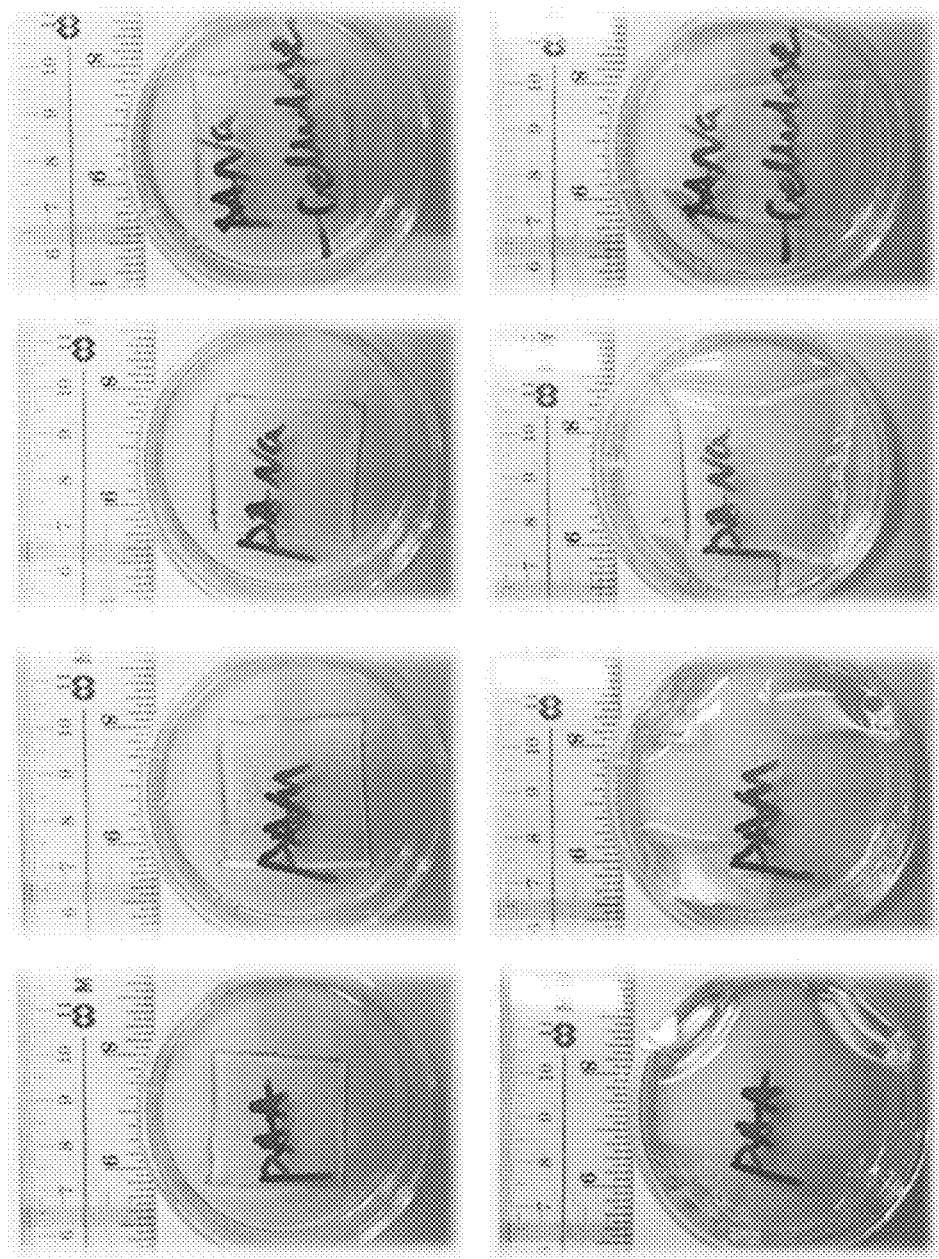
FIG. 7C is the photos of PAA, PAM, PANa and PANa-cellulose hydrogel at initial state and containing 300% 6M KOH solution for 24 h.
Figure 7D:
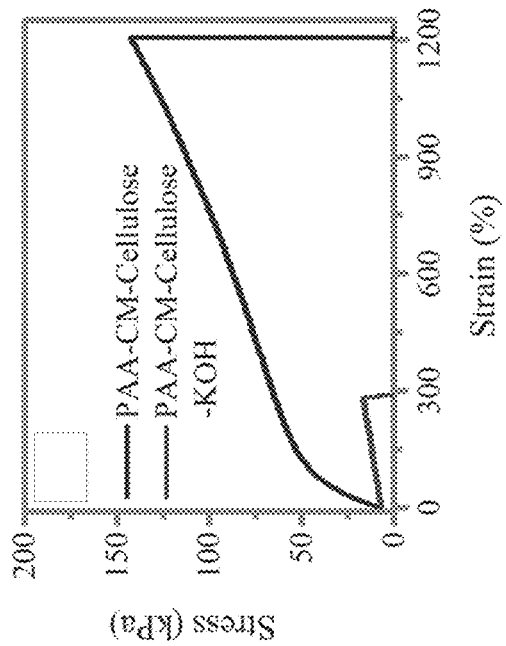
FIG. 7D shows the comparison of alkaline tolerant capability of different hydrogel electrolytes including PAA, PAM, PANa and PANa-cellulose hydrogels.
Figure 7E:
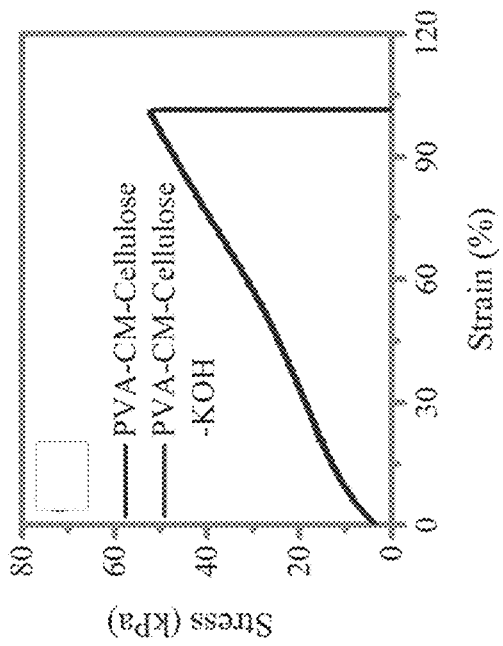
FIG. 7E is a plot of stress versus strain curves of PAA-cellulose hydrogel at initial state and after 300% swelling in 6M KOH aqueous solution.
Figure 7F:
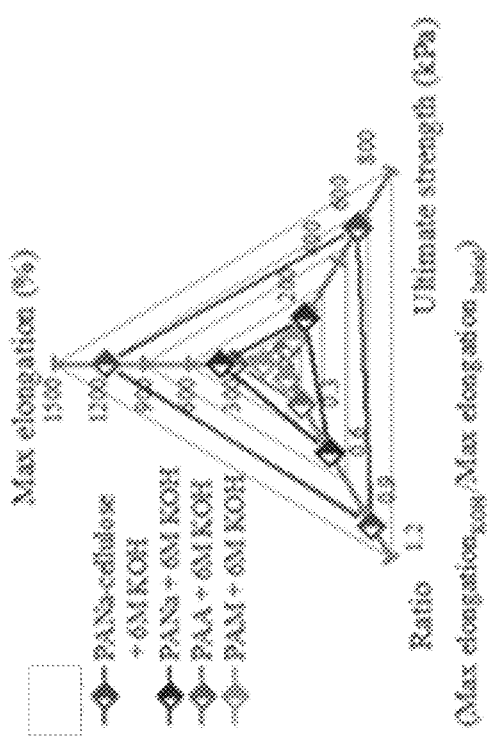
FIG. 7F is a plot of stress versus strain curves of PAM-cellulose hydrogel at initial state and after 300% swelling in 6M KOH aqueous solution.
Figure 7G:
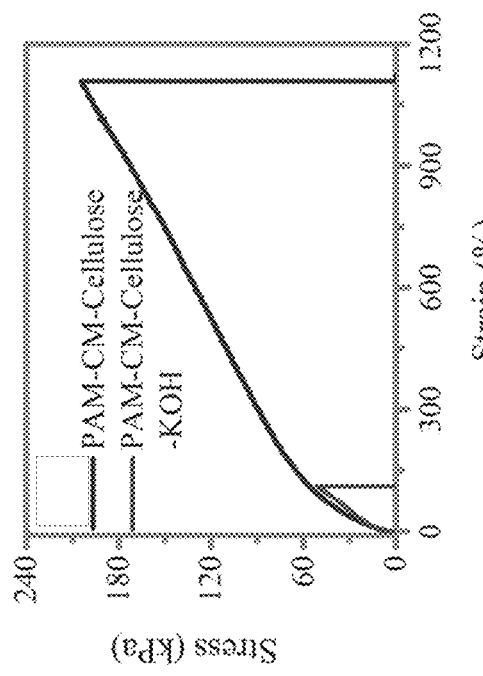
FIG. 7G is a plot of stress versus strain curves of PVA-cellulose hydrogel at initial state and after 300% swelling in 6M KOH aqueous solution.
Figure 7H:
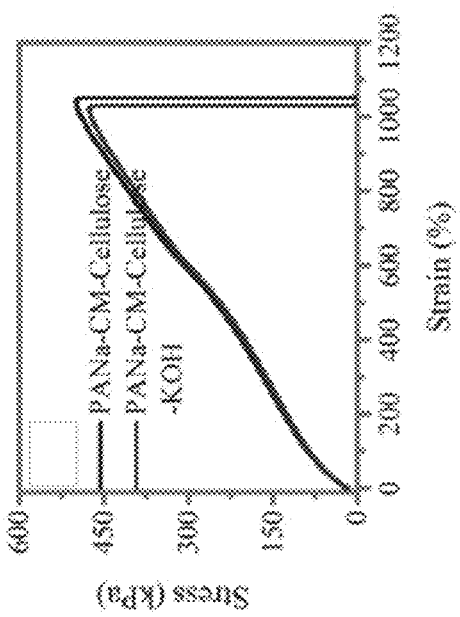
FIG. 7H is a plot of stress versus strain curves of PANa-cellulose hydrogel at initial state and after 300% swelling in 6M KOH aqueous solution.
Figure 7I:
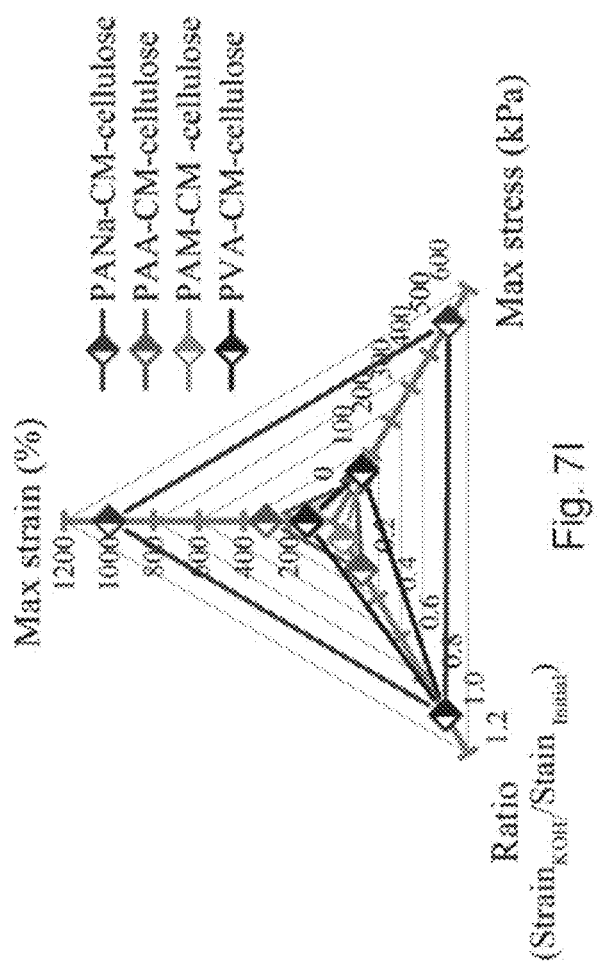
FIG. 7I shows the comparison of alkaline tolerant capability of different hydrogel electrolytes including PAA-cellulose, PAM-cellulose, PVA-cellulose and PANa-cellulose hydrogels.

The tensile properties of PANa-cellulose, polyacrylic acid (PAA), polyacrylamide (PAM) and PANa hydrogel under alkaline condition have also been compared. As shown in the insert of FIG. 7B, the volume of PAA, PAM and PANa hydrogel expands dramatically after soaking them in alkaline solution for only 8 h. The dramatic volume expansion of PAA, PAM and PANa hydrogel is even more prominent when the soaking period is increased to 24 h (FIG. 7C). Such volume expansion is as a result of heavily damaged hydrogel network, which may be accounted for by the hydrolysis reaction of $OH^-$ ions with —COOH or —$NH_2$ groups in the hydrogels. In addition, their mechanical performance rapidly declines accordingly (FIG. 7B).

In sharp contrast, there is no obvious volume expansion for PANa-cellulose hydrogel being subjected to the same conditions and the PANa-cellulose hydrogel exhibited outstanding tensile properties. With reference to FIGS. 7D to 7I, PANa-cellulose hydrogel is the first alkaline tolerant polyelectrolyte while possessing outstanding stretchability among the hydrogels in this disclosure.

Figure 7J:
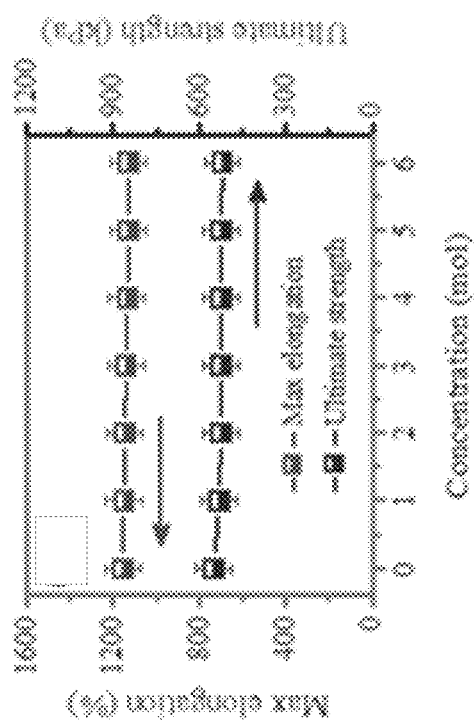
FIG. 7J is a plot showing the ultimate strength and maximum elongation of PANa-cellulose hydrogel electrolyte containing KOH solution with different concentrations for 8 h.
Figure 7K:
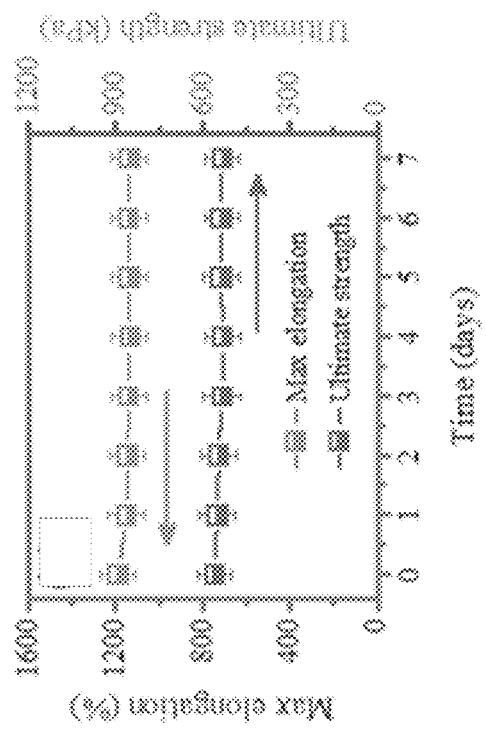
FIG. 7K shows the ultimate strength and maximum elongation of PANa-cellulose hydrogel electrolyte containing 300% 6M KOH solution after different alkaline corrosion times.

The mechanical properties of PANa-cellulose hydrogel containing different concentrations of alkaline solutions and undertaking 6M KOH solution corrosion for different time are also investigated (FIG. 7J and FIG. 7K). Whether it absorbs different concentration of KOH solution or is corroded over a long period by 6M KOH solution, the tensile elongation and ultimate strength remain relatively constant, suggesting good adaptability of the PANa-cellulose hydrogel to alkaline condition.

Figure 8:
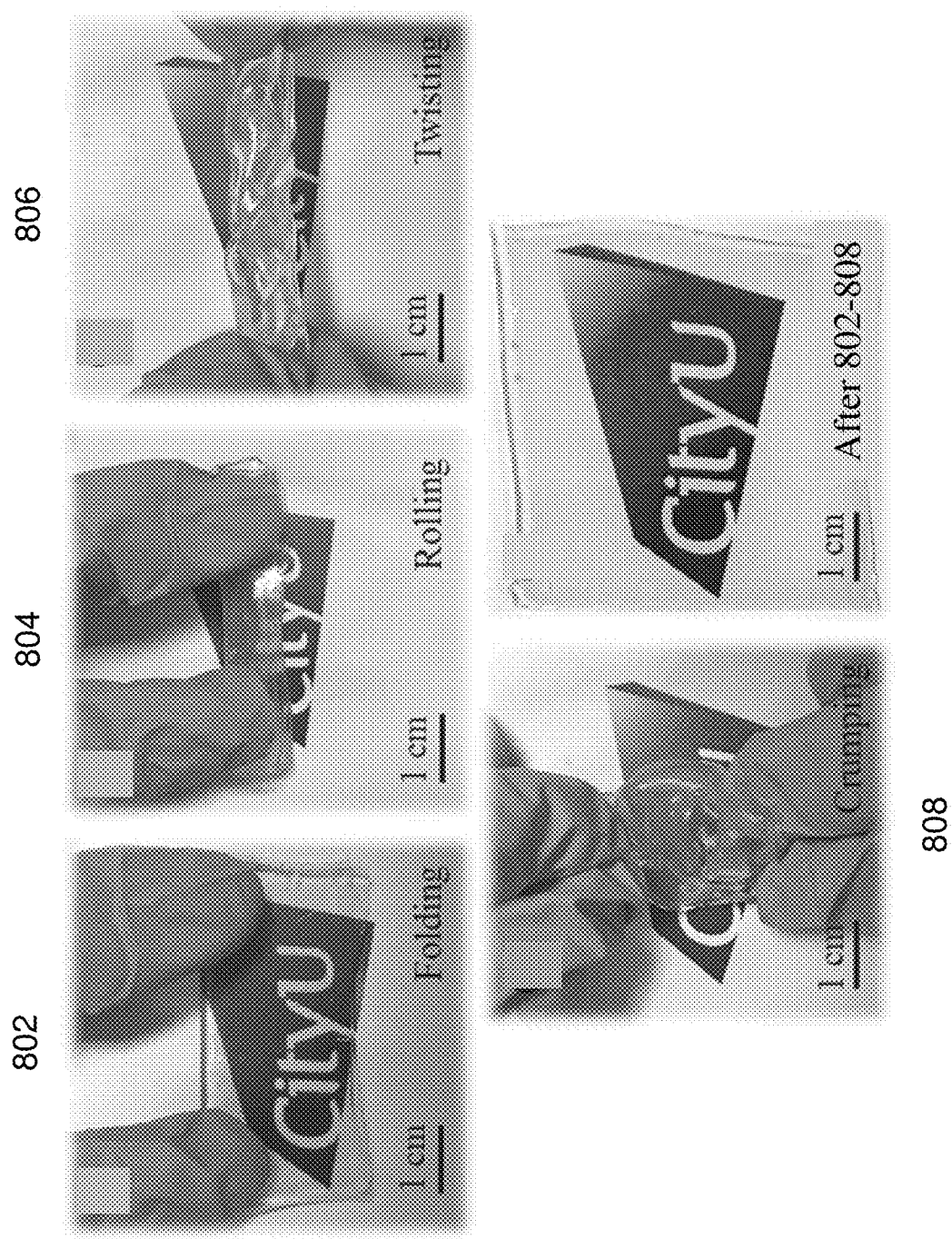
FIG. 8 is a series of photos showing PANa-cellulose hydrogel electrolyte being subjected to different mechanical deformation and sequentially released.
Figure 9A:
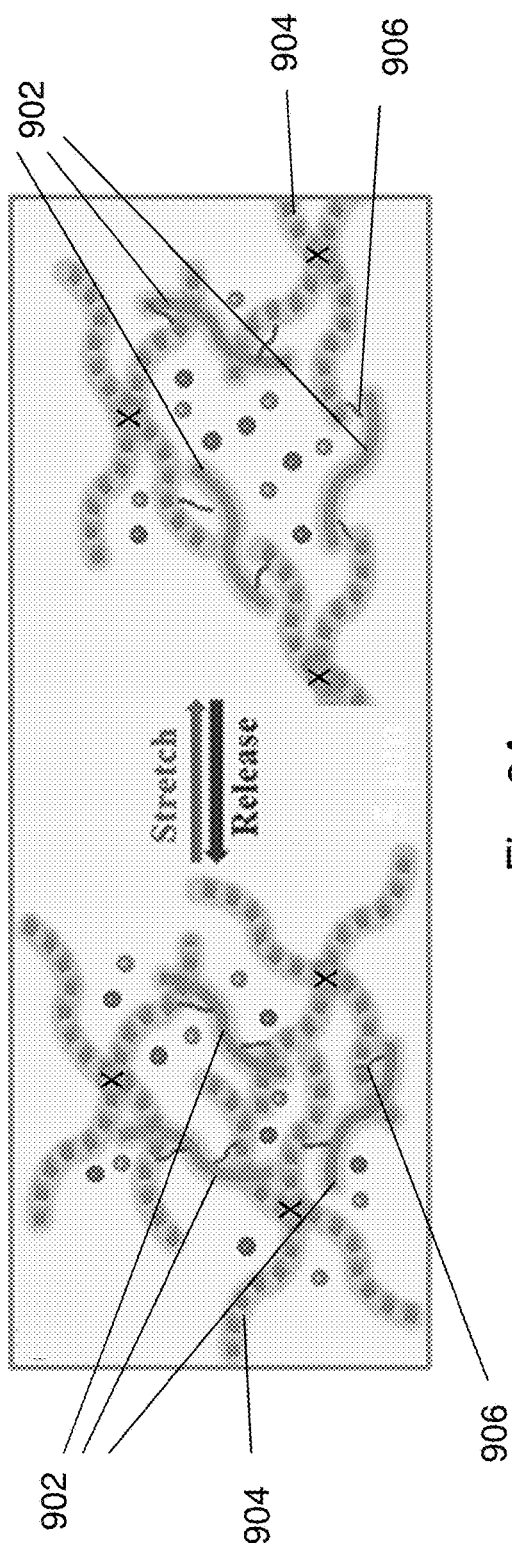
FIG. 9A is a schematic representation illustrating the mechanism of ultra-stretchability of the PANa-cellulose polyelectrolyte.

The polyelectrolyte not only shows excellent stretchability, but also good flexibility. It can be folded (802), rolled (804), twisted (806), and crumpled (808) without any mechanical failure and visible cracks (FIG. 8), demonstrating its excellent softness. The excellent stretchability and softness of the PANa-cellulose hydrogel originate from celluloses and MBAA-assisted toughening and hydrogen bond crosslinking mechanism (FIG. 9A). As shown, although the cellulose chains 902 show comparatively rigid structure, they uniformly disperse in the intrinsically flexible PANa polymer networks and intertwine with PANa chains 904, endowing extraordinary flexibility. Furthermore, the hydrogen bonds 906 act as reversible crosslinking points that can dynamically break and reform to dissipate mechanical energy during strain. The formation and propagation of fractures are delayed by dispersing the imposed stress through the synergetic effects of the crosslinking celluloses and anchoring MBAAs, leading to excellent tensile strains.

Instead of a randomly coiled conformation to dissipate energy via the rupture of the entangled polymer chains, the dynamic process reorganizes the polymer chains and thus distributes the applied stress rapidly and uniformly over the entire network. Notably, the mechanical properties completely retained at a high concentration of alkaline condition, this is attributed to the carboxylate radicals of AA that are neutralized by $OH^-$ ions as well as the celluloses acting as an alkaline molecular stabilizer, suppressing the hydrolysis of polymer networks under the alkaline medium.

Figure 9B:
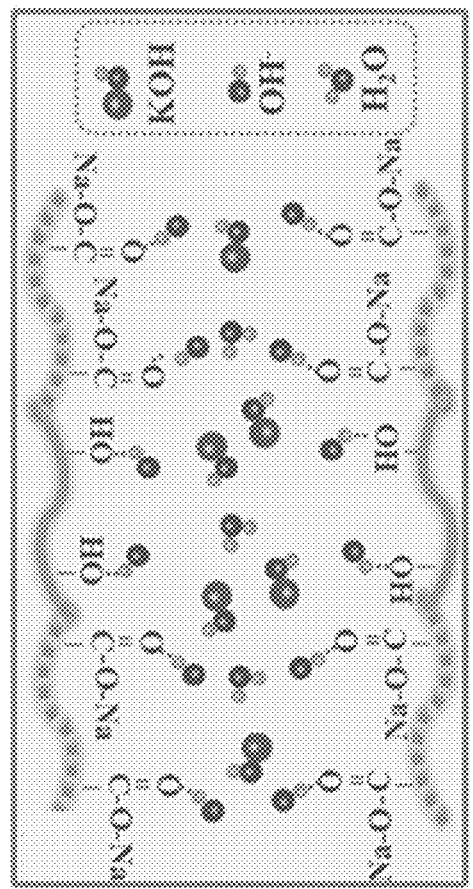
FIG. 9B is a schematic diagram reflecting structure of PANa-cellulose polyelectrolyte entrapped KOH and water via the interactions of hydrogen bonds.

When pre-polymerized AA monomer in presence of cellulose gel was neutralized by sodium hydroxide, the $OH^-$ ions are also connected with cellulose via hydrogen bonds, which could further improve the alkaline tolerance of the PANa-cellulose hydrogel (FIG. 9B). Meanwhile, intertwining interaction between PANa and cellulose chains effectively suppresses the volume expansion of the PANa-cellulose hydrogel.

The superior stretchability and high ion conductivity validate the application of PANa-cellulose in a highly stretchable zinc-air battery. To fabricate the stretchable zinc-air battery, flexible CNT paper is employed as electrode owing to its high porosity for air diffusion and good contact with the polyelectrolyte.

The high-performance electrocatalysts of Fe—N—C on two-dimensional (2D) porous carbon are attached on the CNT paper to enhance oxygen reduction reactions (ORR) and oxygen evolution reaction (OER). The electrocatalyst exhibits a two-dimensional structure, which can provide abundant active sites, resulting in excellent electrocatalytic activity.

Figure 10A:
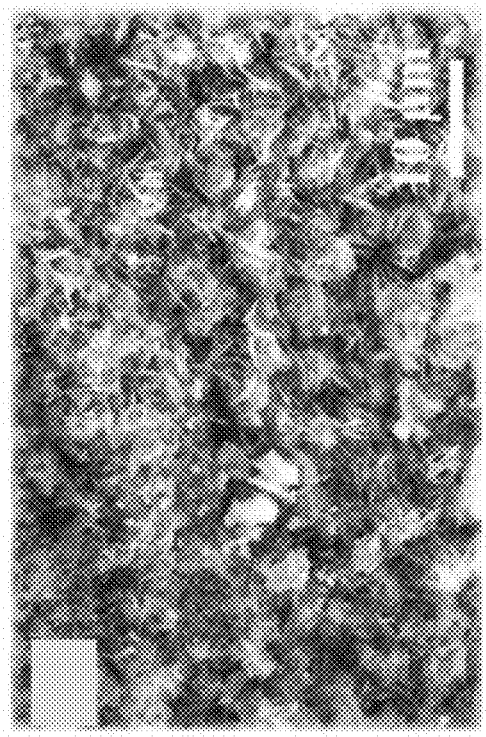
FIG. 10A is a SEM image of deposited zinc metal on CNT flim.

The catalysts loaded CNT paper serves as both air diffusion layer and/or current collector. The zinc-deposited CNT paper, with its morphology shown in FIG. 10A, is employed as flexible anode.

Figure 10B:
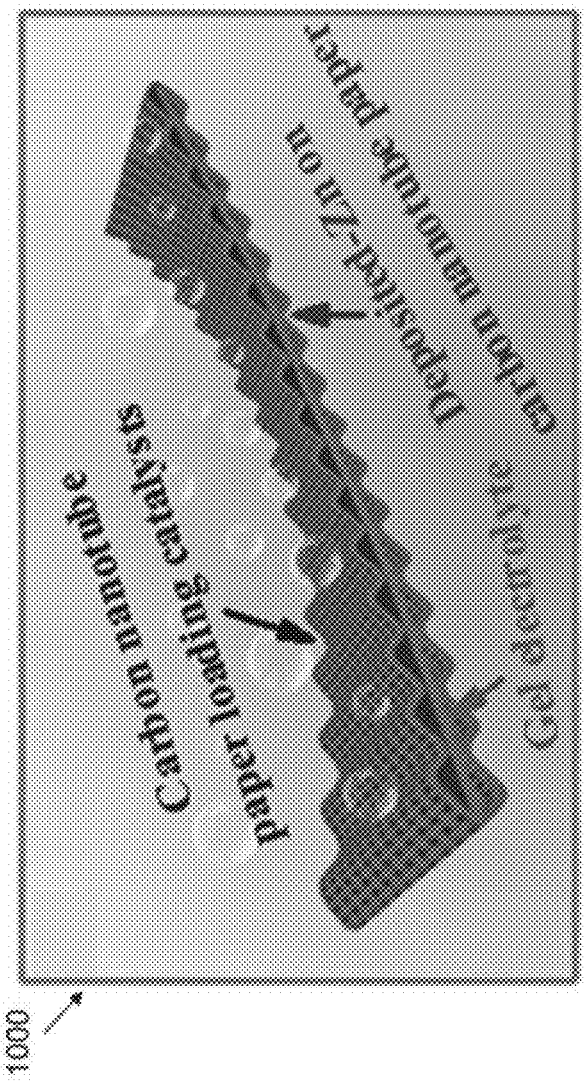
FIG. 10B is a schematic representation of a flat-shaped zinc-air battery.

To construct a 800% stretchable flat-shape battery, the PANa-cellulose polyelectrolyte film is pre-stretched with a >800% strain. The CNT air electrode and the flexible zinc electrode, are directly attached on each side of the pre-stretched polyelectrolyte as air cathode and anode, respectively. After releasing the pre-stretched hydrogel electrolyte, a stretchable zinc-air battery 900 is obtained with wavy-structured electrodes (FIG. 10B). The wavy structure provides abundant wrinkled areas, which supplies adequate space for stretch.

Figure 11E:
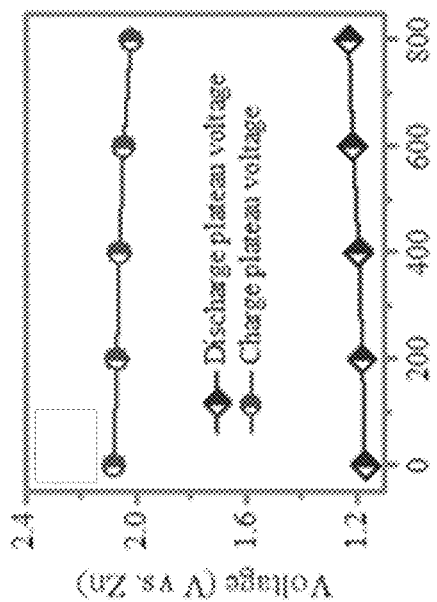
FIG. 11E is a plot showing the corresponding discharging-charging voltage plateau at different stretching strains of FIG. 11D.

With reference to FIG. 11A and FIG. 11B, there are shown the charge-discharge polarization curves and corresponding power densities of the stretchable zinc-air battery 900 at released state and different tensile elongations. The electrochemical performance enhances with increase of tensile elongation (FIG. 11C). The maximum output power densities achieve an enhancement of around twice at 800% strain, compared to that of the fully released state. This phenomenon derives from the increased contact areas between active materials (i.e. Fe—N—C on porous carbon) and the polyelectrolyte.

Figure 11D:
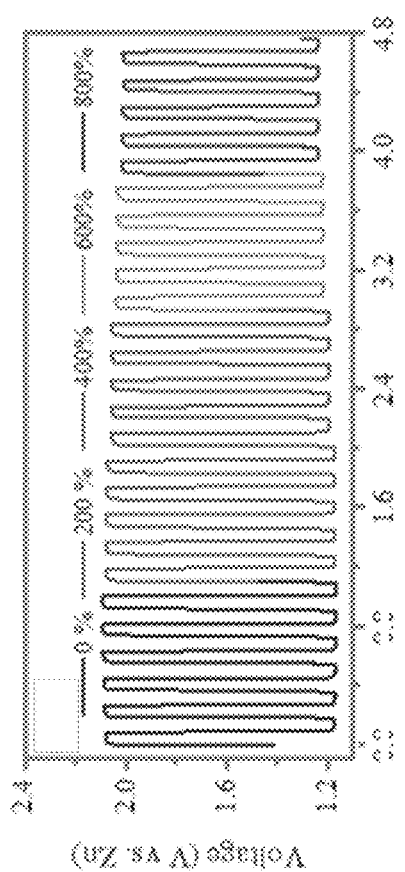
FIG. 11D is a plot showing galvanostatic discharge-charge cycling curves of the flat-shape zinc-air battery of FIG. 10B at a current density of 5 mA·cm$^{-2}$.
Figure 11F:
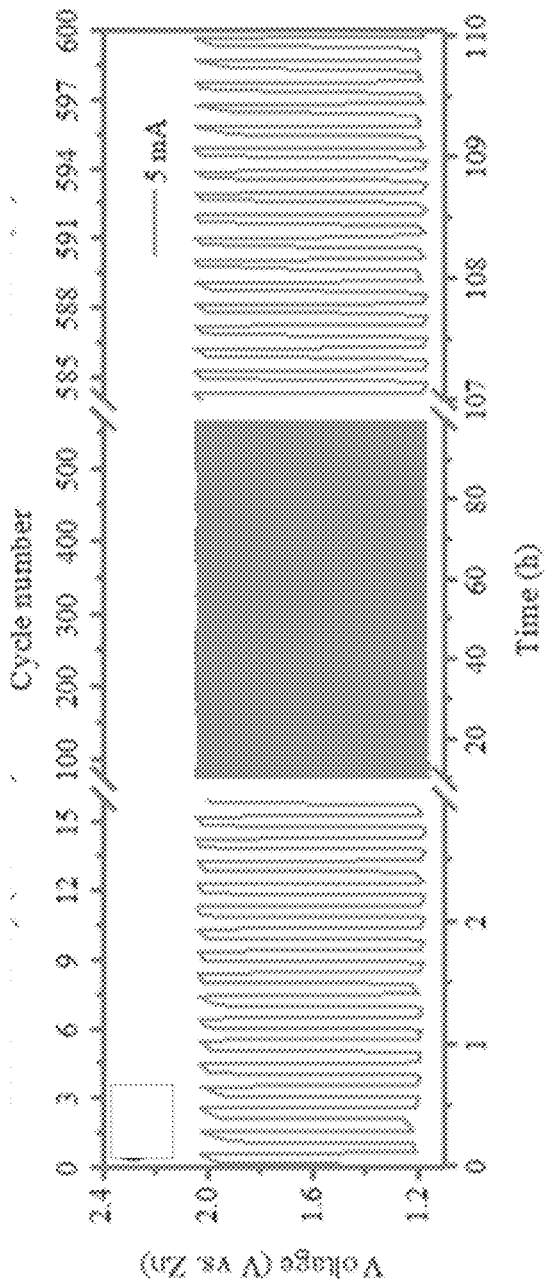
FIG. 11F is a plot showing the cycling test for rechargeability of the flat-shape zinc-air battery of FIG. 10B at a current density of 5 mA·cm$^{-2}$.

The galvanostatic charge-discharge curves at different tensile strains are shown in FIG. 11D. The discharge plateau moves up while the charge plateau drops (FIG. 11E), resulting in enhancement of energy efficiency of zinc-air battery 900. Meanwhile, the functional zinc-air battery 900 shows excellent charge-discharge stability up to 600 cycles (110 h continuous charge-discharge tests) without degradation (FIG. 11F).

Furthermore, the superior stretchable zinc-air battery 900 also exhibits excellent flexibility and toughness. As shown in FIG. 12A, the zinc-air battery 1000 can be folded (1202), rolled (1204), twisted (1206) and crumped (1208) without cracks and delamination. Its electrochemical performance was vastly retained after continuous elastic deformation (1202-1208), as shown in FIG. 12B, which is ascribed to high flexibility and robustness of polyelectrolyte together with CNT-base electrodes.

To further demonstrate the applicability of the zinc-air battery 1000, two batteries 1000 after subjecting to the aforementioned deformation, were attached to a flexible battery-display system in series behind a 90 $cm^2$ electroluminescent panel (FIG. 12C). Since both components are flexible, the battery-display system can be easily bent while the brightness of the electroluminescent panel keeps stable benefiting from the reliable power output of the zinc-air battery under deformations.

A potential application of endowing devices with stretchability is to enhance their weaveability and compatibility with textile industry at device level. On this basis, a fiber-shaped stretchable water-proof zinc-air battery 1200 has been fabricated and its mechanical and electrochemical properties have been investigated.

Figure 13A:
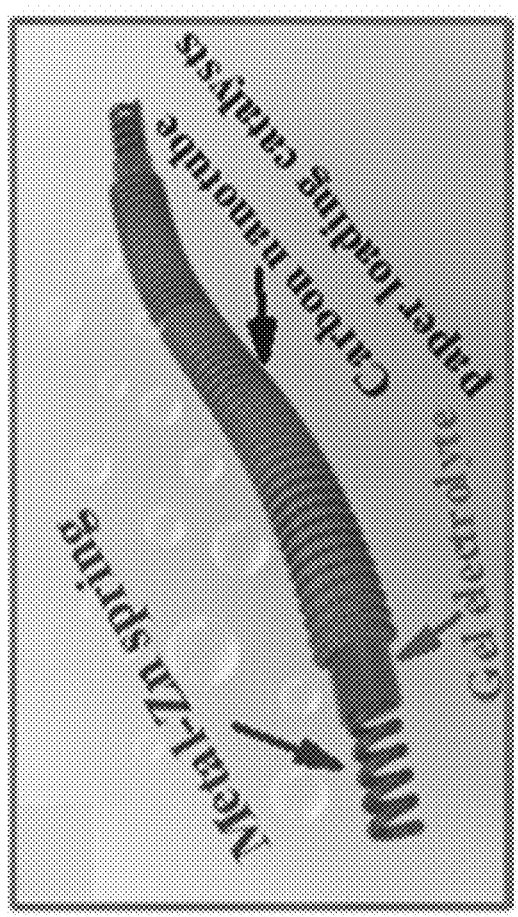
FIG. 13A is a schematic representation of a fiber-shaped zinc-air battery.
Figure 13B:
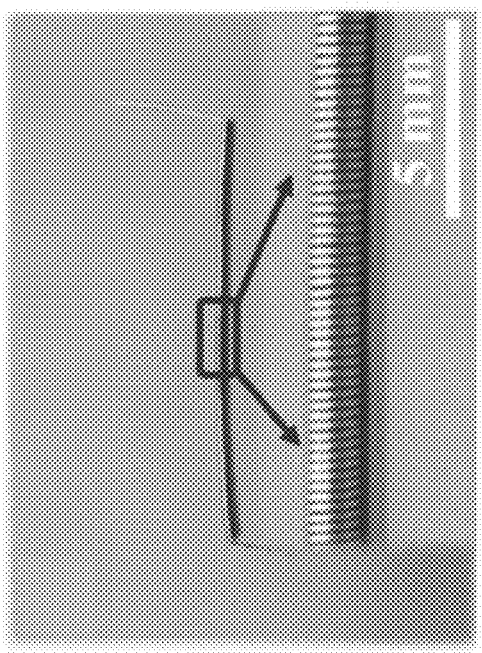
FIG. 13B is a photo of a zinc spring. The insert is an enlarged portion of the zinc spring.

To fabricate the fiber-shaped super-stretchable zinc-air battery 1300 as shown in FIG. 13A, the air electrode is directly coated on surface of a 500% pre-stretched hydrogel electrolyte coated Zn-spring. An optical photo of the zinc spring is shown in FIG. 13B. In this example, the fabricated battery may have a strain of at least 500% and is capable of maintaining a stable charge-discharge performance at a current density of 5 $mA \cdot cm^{-2}$ under such predetermined strain.

The electrochemical discharge curves and corresponding power output is shown in FIGS. 14A and 14B, suggesting a constant charge output capability under different deformations. Further referring to FIGS. 14A and 14B, there is provided the comparison of the charge-discharge properties and the corresponding maximum power output of the fiber-shaped stretchable zinc-air battery 1300 under different deformations.

As shown in FIGS. 14A and 14B, the electrochemical performances of the battery 1300 are vastly retained even after the device being heavily bent, knotted and twisted. The very little degradation observed may be caused by insufficient gas diffusion under the knotted and twisted conditions. More importantly, after experiencing various deformation conditions, the power density fully recovers to the original value when the battery is recovered back to its initial status (FIG. 14B), verifying a high durable and superior robustness of the fiber-shaped zinc-air battery 1300.

Moreover, the fiber-shaped zinc-air battery 1300 can be stretched up to 500%. Their electrochemical performances are also enhanced with enlarged strains, similar to the flat-shape zinc-air battery 1000 (FIGS. 14C-14E). The charge-discharge stability of fiber-shaped battery at 500% tensile elongation is also investigated. As shown in FIG. 14F, after 55 h (300 cycles) continuous charge-discharge cycles, the discharge-charge voltage plateaus maintain almost unchanged at current density of 5 $mA \cdot cm^{-2}$.

To enhance washability of the fiber-shaped battery 1300, after hydrophobic treatment of air cathode, the water survivability of fiber-shaped zinc-air battery 1300 is evaluated. The charge-discharge curves and corresponding power density curves retain almost unchanged after 2 h water immersion and it can power an electronic watch with part of the battery in air, demonstrating excellent environment adaptability of the batteries (FIGS. 14A and 14B). Similar to the flat-shaped battery 1000, the fiber-shaped battery 1300 can also be used to power electronic devices. For example, as shown in FIG. 14C, four fiber-shaped zinc-air batteries are integrated into wristband to effectively power a smart watch.

The electrolyte of the present invention is advantageous since the electrolyte is alkaline-tolerant and can be easily stretched up to 1000% even in the presence of 300% (vs. the weight of hydrogel) 6M KOH aqueous solution. The electrolyte also shows a high ion conductivity of 0.28 $S \cdot cm^{-2}$. These properties render the electrolyte highly suitable for use in flexible and wearable electronic devices.

The energy storage devices derived from the electrolyte, such as the flat-shaped battery 1000 and the fiber-shaped battery 1300 provide stable power output with enhanced capacity even after being stretched to at least a 500% strain, suggesting an excellent wearing compatibility of the batteries of the present invention. In addition, the scaling up of the batteries is very cost effective as it does not require a water-free and/or oxygen-free environment for assembling the batteries.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An electrolyte for use in an energy storage device, comprising:
a polymer matrix comprising sodium polyacrylate, cellulose, and sodium hydroxide, wherein the sodium polyacrylate includes carboxylate radicals and the sodium hydroxide contains a hydroxide ion, and wherein the amount of cellulose is 2.7% by mole percentage of monomer of the sodium polyacrylate; and
an electrolytic solution retained by the polymer matrix, wherein the electrolytic solution includes 6M potassium hydroxide;
wherein the polymer matrix includes:
a covalently crosslinked structure defined by a plurality of sodium polyacrylate polymer chains that are covalently crosslinked with each other by N,N'-methylenebisacrylamide and that are covalently crosslinked with a plurality of cellulose chains; and
a physically crosslinked structure defined by the plurality of sodium polyacrylate polymer chains entangling with and forming hydrogen bond with the plurality of cellulose chains;
wherein the hydroxide ion of the sodium hydroxide neutralizes the carboxylate radicals of the sodium polyacrylate polymer chains and forms hydrogen bond with the cellulose chains, such that hydrolysis of the polymer matrix by the presence of potassium hydroxide is minimized, and the polymer matrix remains substantially intact upon receiving an external load.

2. The electrolyte for use in an energy storage device according to claim 1, wherein the retained electrolytic solution further includes a zinc-based compound.

3. The electrolyte for use in an energy storage device according to claim 2, wherein the zinc-based compound is an organic compound of zinc.

4. The electrolyte for use in an energy storage device according to claim 3, wherein the organic compound of zinc is zinc(II) acetate.

5. The electrolyte for use in an energy storage device according to claim 1, wherein the electrolyte can elastically deform in a way of rolling, folding, twisting, or crumpling without mechanical or structural damage.

6. The electrolyte for use in an energy storage device according to claim 1, wherein the electrolyte has a strain of at least 1000%.

7. The electrolyte for use in an energy storage device according to claim 1, wherein the electrolyte has an ion conductivity of 0.28 $S \cdot m^{-1}$.

8. The electrolyte for use in an energy storage device according to claim 1, wherein the cellulose is carboxylmethyl cellulose.

9. An energy storage device, comprising:
a first electrode and a second electrode, the first and the second electrode being spaced apart from each other,
an electrolyte disposed between the first electrode and the second electrode, the electrolyte comprising a polymer matrix including sodium polyacrylate, cellulose, and sodium hydroxide, wherein the sodium polyacrylate includes carboxylate radicals and the sodium hydroxide contains a hydroxide ion, wherein the amount of cellulose is 2.7% by mole percentage of monomer of the sodium polyacrylate; and an electrolytic solution retained by the polymer matrix wherein the electrolytic solution includes 6M potassium hydroxide; and
wherein the polymer matrix includes:
a covalently crosslinked structure defined by a plurality of sodium polyacrylate polymer chains that are covalently crosslinked with each other by N,N'-methylenebisacrylamide and that are covalently crosslinked with a plurality of cellulose chains; and
a physically crosslinked structure defined by the plurality of sodium polyacrylate polymer chains entangling with and forming hydrogen bond with the plurality of cellulose chains;
wherein the hydroxide ion of the sodium hydroxide neutralizes the carboxylate radicals of the sodium polyacrylate polymer chains and forms hydrogen bond with the cellulose chains, such that hydrolysis of the polymer matrix by the presence of potassium hydroxide is minimized, and the polymer matrix remains substantially intact upon receiving an external loads.

10. The energy storage device according to claim 9, wherein the first electrode is an anode including a piece of zinc metal or a substrate deposited with zinc metal.

11. The energy storage device according to claim 9, wherein the second electrode is a cathode including a substrate deposited with an active material.

12. The energy storage device according to claim 10, wherein the substrate is selected from the group consisting of carbon nanotube paper, carbon cloth, carbon paper and nickel foam.

13. The energy storage device according to claim 9, wherein the active material is Fe—N—C on porous carbon.

14. The energy storage device according to claim 12, wherein the Fe—N—C on porous carbon is obtained by pyrolysis of Fe-ZIF-8 on graphene precursor at 700-1,000° C.

15. The energy storage device according to claim 9, wherein the device has a strain of at least 500%.

16. The energy storage device according to claim 9, wherein the device can elastically deform while maintaining electrochemical performance of the device.

17. The energy storage device according to claim 16, wherein the device can elastically deform in a way of folding, rolling, twisting, crumping, bending, or knotting without mechanical or structural damage while maintaining electrochemical performance of the device.

18. The energy storage device according to claim 9, wherein the device maintains a stable charge-discharge performance at a current density of 5 mA·cm$^{-2}$ under a predetermined strain.

19. The energy storage device according to claim 9, wherein the energy storage device is a rechargeable battery.

20. The energy storage device according to claim 19, wherein the rechargeable battery is a flat-shaped battery or a fiber-shaped battery.

21. The energy storage device of claim 9, wherein the cellulose is carboxylmethyl cellulose.

* * * * *